United States Patent [19]
Bona et al.

[11] Patent Number: 5,710,934
[45] Date of Patent: Jan. 20, 1998

[54] METHODS AND TEST PLATFORMS FOR DEVELOPING AN APPLICATION-SPECIFIC INTEGRATED CIRCUIT

[75] Inventors: Mariano Bona, Grenoble; Pierre-Albert Comte, Moirans; Duc Pham-Minh, Grenoble, all of France

[73] Assignee: SGS-Thomson Microelectronics, S.A., Gentilly Cedex, France

[21] Appl. No.: 441,652

[22] Filed: May 15, 1995

Related U.S. Application Data

[63] Continuation of Ser. No. 70,706, May 27, 1993, abandoned.

[30] Foreign Application Priority Data

May 27, 1992 [FR] France ................... 92 06514

[51] Int. Cl.⁶ ............................ G06F 9/455
[52] U.S. Cl. ............... 395/800; 395/800; 395/183.06; 364/232.8; 364/267; 364/282; 364/DIG. 1
[58] Field of Search ................... 395/800, 828, 395/835, 882, 500, 180, 182.03, 182.08, 183.01, 183.06, 183.07, 183.13, 183.14; 371/16.2, 25.1

[56] References Cited

U.S. PATENT DOCUMENTS

| | | | |
|---|---|---|---|
| 4,617,663 | 10/1986 | Lake et al. | 371/25.1 |
| 4,789,924 | 12/1988 | Fukuta | 395/500 |
| 4,796,258 | 1/1989 | Boyce et al. | 371/16.2 |
| 5,053,949 | 10/1991 | Allison et al. | 395/375 |
| 5,136,590 | 8/1992 | Polstra et al. | 371/16.2 |

FOREIGN PATENT DOCUMENTS 2534057  4/1984  France.

OTHER PUBLICATIONS

Electro, vol. 11, 1986, Los Angeles, US, pp. 19/3 1–9, by Charlies Melear, "Small Evaluation Boards provide Flexibility and Economy".

EDN Electrical Design News, vol. 34, No. 6, Mar. 16, 1989, Newton, Massachusetts, US, pp. 131–144, Eric P. Horton, "Construct a low-cost 8096-family development system".

EDS Electrical Design News, vol. 35, No. 8, Apr. 12, 1990, Newton, Massachusetts, US, pp. 77–84, Richard A. Quinnell, "16–bit debugging tools perform at low cost".

*Primary Examiner*—Alpesh M. Shah
*Attorney, Agent, or Firm*—Robert Groover; Betty Formby; Matthew Anderson

[57] ABSTRACT

Methods and test platforms for developing an application-specific integrated circuit incorporating, on the same chip, a signal processor core, RAM memory and ROM memory intended to receive a management program and processing program, and input-output management peripherals specific to the application. The signal processor, RAM memory and ROM memory correspond respectively to existing separate IC components. The processing program is developed and tested on a test platform including at least these separate IC components together with a core-emulation integrated circuit, which includes the signal processor core in a minimal configuration. An interface program and diagnostic interface logic allows the platform to be controlled from a microcomputer, which can thereby implement automatic chaining of tests.

34 Claims, 22 Drawing Sheets

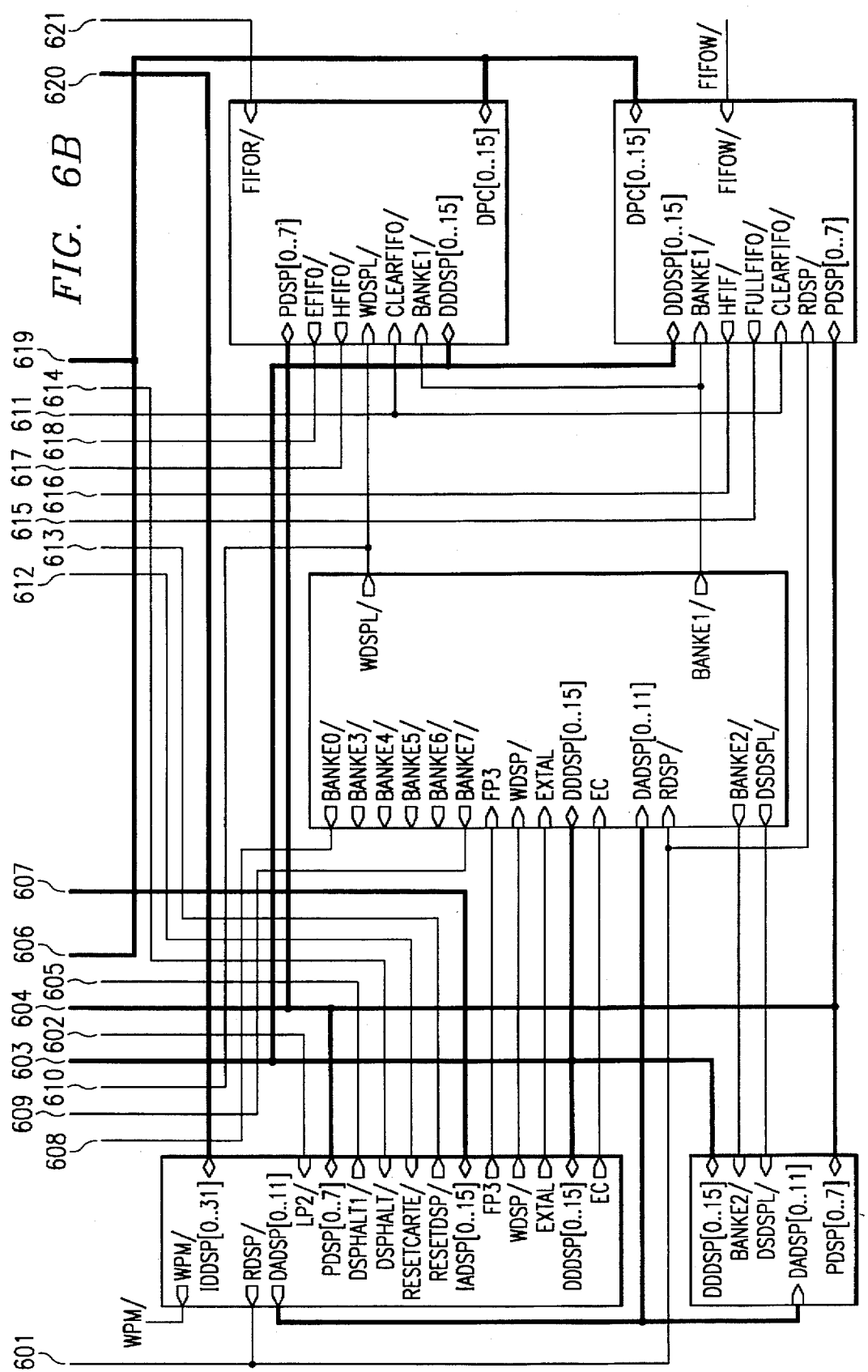

METHODS AND TEST PLATFORMS FOR DEVELOPING AN APPLICATION-SPECIFIC INTEGRATED CIRCUIT

This is a continuation of application Ser. No. 08/070,706, filed May 27, 1993, now abandoned.

CROSS-REFERENCE TO RELATED APPLICATION

This application claims priority from French App'n 9206514, filed May 27, 1992, which is hereby incorporated by reference.

BACKGROUND AND SUMMARY OF THE INVENTION

The present invention relates to the development of integrated circuits having complex resident software.

Current semi-conductor manufacturing technologies make it possible to integrate an ever growing number of components onto a single slice of monocrystalline semi-conductor material (silicon, gallium arsenide, etc.).

This permits the manufacture of integrated circuits (ICs) such as those for general distribution (microprocessors for instance), semi-customized ICs incorporating a programmable memory (to make them compatible with varied applications), and application-specific integrated circuits.

The present invention relates especially to the development of the last category of above-mentioned ICs, which are generally referred to as ASICs (Application-Specific Integrated Circuits).

These components, with the aid of computers, are designed from known elements, which enables design time to be reduced. Customizing these components allows optimization of their price/performance ratio and reliability.

Conventional ASIC circuits, and the current techniques for developing these circuits, are now proving to be inadequate for the following reasons:

The project specifications of equipment vendors using ICs are tending to change, particularly in the field of telecommunications and data processing. This development calls for:

even higher performance (due to the need for more complex calculations), an ever larger scale of integration (due to the need for dedicated products with lower consumption and greater autonomy), AND very low prices (due to competition).

In addition, ongoing development of the art now makes it possible to obtain more and more powerful computing and simulation means, and to fabricate denser (0.5 μm) and larger ICs.

This in turn leads to the following developments:

derivations of ASIC circuits (Applications Specific Integrated Circuits) which allow integration of several functions on the same circuit, a reduction in costs and overall dimensions, and enhanced reliability, performance and autonomy of equipment; and the increasing complexity of these ASIC circuits, including programmable components for very complex computing operations which cannot be performed by any other method (only in hardware). These computing operations are therefore performed with the aid of microprocessors or DSPs (Digital Signal Processors), which are able to perform calculations (addition, multiplication, shifts, etc.) and input/output operations using a specific instruction set.

Thus at the present time, ASICs are produced which incorporate on a single circuit (FIG. 1):
one or more programmable components;
RAM storage;
ROM storage;
AND specific peripherals (input-output management, etc.)

In these configurations, the programmable components use the RAM and ROM storage to perform software functions and algorithms. The peripherals interface the programmable components with the outside world (i.e. with the rest of the application), possibly using the RAM.

Conventional Development of a Conventional ASIC

A so-called "conventional" ASIC circuit is one without any programmable components. As shown in FIG. 2, a conventional ASIC circuit is developed in several steps, namely:

drawing up the project specifications according to constraints (overall dimensions, price, etc.) (A), specification of the circuit corresponding to the project specifications (B), testability study of the circuit (C), production and simulation on a work station of the circuit (D) with the aid of the foundry library (obtainable from the manufacturer of the "hardware" circuit), and test patterns (G) defined by the testability study, generation of masks and fabrication of the circuit (E) and, validation (F) of the circuit with the aid of test patterns.

So-called "programmed" ASIC circuits differ from "conventional" ASIC circuits in that they comprise at least one programmable component which is programmed during development of the circuit.

Conventional Development of a Programmed ASIC

The steps conventional used for development of a programmed ASIC are:

drawing up the project specifications according to constraints (overall dimensions, price, etc.) (A), specification of the circuit corresponding to the project specifications (I).

Selecting of functions to be performed in hardware and those to be performed in software, testability study of the hardware circuit and of the software (J), production and simulation on a work station of a model of the circuit with the aid of the foundry library (manufacturer of the "hardware" circuit), and test patterns (G) defined by the testability study, production of software and test modules with the aid of test patterns defined by the testability study on a work station (Q) with the aid of a model of the circuit, generation of masks and fabrication of the circuit (0), validation of the circuit using test patterns.

This known development method has the following drawbacks:

1) The circuit cannot be totally simulated because of the very long processing times which means that validation is therefore incomplete.

2) The development cost is prohibitive (requires one work station for each person involved).

3) The development time required is long (production of the circuit model and writing of the software is serialized).

Because of this, it is normally preferred to proceed in two steps according to the process shown in FIG. 3:

fabrication of a first non-programmed but programmable version (R) of the circuit (open version) comprising the following steps:

production and simulation of a model of an open circuit version (K);

generation of masks and fabrication of the open circuit (L);

electric validation of the open circuit (M);

writing and functional validation of the software (N) on this circuit and on the final application with the aid of a test bench (MODEM, TELEPHONY, etc.);

fabrication of a second version (1) optimized in terms of cost and including the software (closed version), comprising the following steps:

generation of masks of the closed version and fabrication (O);

electric validation of the closed circuit, functional validation on the final application with the aid of a test bench.

This approach, which overcomes the problem of simulating the circuit, does however pose other problems, particularly:

high development cost due to fabrication of an open version of the final circuit;

long development times due to:

the time spent waiting for the first circuit to be fabricated before writing the software;

the functional validation technique employed is unsuitable for writing and testing the software; since:

the functional validation results provide only global information concerning the behavior of the application+ASIC circuit+software assembly, making it necessary to guess the nature of problems (and hence difficult to distinguish between hardware and software problems);

measurements are carried out in real time on statistics, and cannot be reproduced, which means that it is impossible to verify the validity of a correction;

the software writing—validation loop time is long (validation procedure spanning several days);

the software cannot be partially tested before all the modules have been written, which means that modules cannot be separately validated);

the validation step is long, and costs increase with the number of software modifications made, since the software has to be completely validated with each modification.

To improve on the known processes, it is useful to distinguish three parts of a programmed ASIC circuit (at least during its design):

the hardware (input-output management peripherals, etc.);

the processing software which ensures filtering, digital compression functions, etc.;

the management software which ensures the management of the hardware and the sequencing of the software modules.

The disclosed inventions allow software and hardware to be developed in parallel. This provides the advantages of:

reducing the cost of the circuit by allowing prior choice of the best possible software/hardware trade-off;

reducing the development time of the final circuit by developing the software and hardware in parallel;

enhancing the reliability and facilitate the development of the software by proposing additional validation and debugging means, giving better coverage and low-cost test platforms, making it possible to have several such platforms, unlike the validation bench or work stations; and reducing development costs by avoiding fabrication of an intermediary circuit (open version).

SUMMARY OF THE INVENTION

The present application discloses processes for developing a programmed application-specific integrated circuit incorporating on the same chip:

a (signal) processor core;

a RAM memory and a ROM memory, intended to receive a management program and processing program;

input-output management peripherals specific to the application.

The signal processing core, RAM memory and ROM memory correspond respectively to existing discrete components.

The hardware and the management program, and interactions between them, are developed by simulation using a work station and test patterns (testability study).

In accordance with the invention, the processing program is developed and tested on a test platform comprising at least the said discrete components with the aid of an interface program which allows the platform and the automatic chaining of tests to be controlled by a microcomputer.

In different preferred embodiments, the process of the invention comprises the following steps (which optionally can be varied over all technically possible combinations):

fabrication of a programmable ("open") version of the programmed ASIC circuit and a test platform for the programmable circuit in order to develop and test the processing program;

fabrication of a programmed ("closed") version of the circuit and a test platform for this closed circuit in order to validate the processing and management programs;

conducting tests on the test platform comprising digital data transmissions passing directly between the microcomputer and the test platform, independently of the application's specific input/output peripherals;

conducting tests on the platform comprising remote loading of a program from the microcomputer into the RAM memory of the test platform;

building up by simulation or experimentation of a data base of tests and the results obtained in the microcomputer;

comparison of test results with the expected results (stored in the data base) corresponding to either simulations or previous experiments;

controlling the test platform by means of an interface program which allows chaining of tests of the processing program in automatic fashion both in and outside real time. (Note that the management program allows the activation and deactivation of test and display points defined in the processing software, display of the contents of the memories and main registers of the core of the DSP (or microprocessor), and execution of the program in or outside of real time, in order to validate it.)

Various innovative teachings disclosed herein also provide a test platform for developing a programmed application-specific integrated circuit which includes a signal processor, RAM and ROM for management and processing programs, and application-specific input/output management peripherals. This platform comprises discrete components corresponding respectively to the core of the signal processor, to the RAM memory, and to the ROM memory, and also includes digital paths allowing the processing program to be tested from a microcomputer.

Various innovative teachings disclosed herein also provide such a platform which comprises discrete components corresponding respectively to the programmable version of the programmed ASIC integrated circuit, to the RAM memory, to the ROM memory and digital paths allowing the processing program to be tested from a microcomputer.

Various innovative teachings disclosed herein also provide such a platform which comprises discrete components corresponding respectively to the programmed version of the programmed ASIC integrated circuit, to the RAM memory and digital paths, and allows processing and management programs to be validated independently of the final application.

Of course, many previous attempts have been made to develop tools for development, debugging, and/or monitoring. Some examples of particular interest include: Melear, "SmallEvaluation boards provide flexibility and economy," ELECTRO 1986, vol. 11, pages 19/3: 1–9; U.S. Pat. No. 4,617,663 to Lake et al.; Horton, "Construct a low-Cost 8096-family development system, 34 EDN no. 6 (Mar. 16, 1989), at pages 131–144; Quinnell, 16-bit Debugging Tools perform at low cost, 35 EDN no. 8 (Apr. 12 1990), at pages 77–84; French application FR-A-2,534,057 to Chemla; all of which are hereby incorporated by reference.

Many publications have also proposed various hardware scan paths for diagnostics and/or monitoring. See, e.g., Lien et al., "A Universal Test and Maintenance Controller for Modules and Boards," 36 IEEE TRANS'NS INDUS. ELECTRONICS 231 ff (May 1989), which is hereby incorporated by reference, describes a test controller which performs testing of multiple chips over a test bus.

BRIEF DESCRIPTION OF THE DRAWING

The present invention will be described with reference to the accompanying drawings, which show important sample embodiments of the invention and which are incorporated in the specification hereof by reference, wherein:

FIGS. 6A and 6B give an overall drawing of the components used to produce the platform shown in FIG. 5, and FIGS. 7 to 17 detailed diagrams of each component element:

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
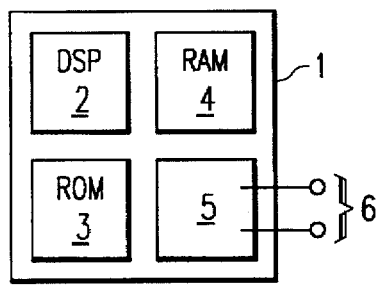
FIG. 1 is a schematic drawing of a programmable ASIC according to the prior art.
Figure 2:
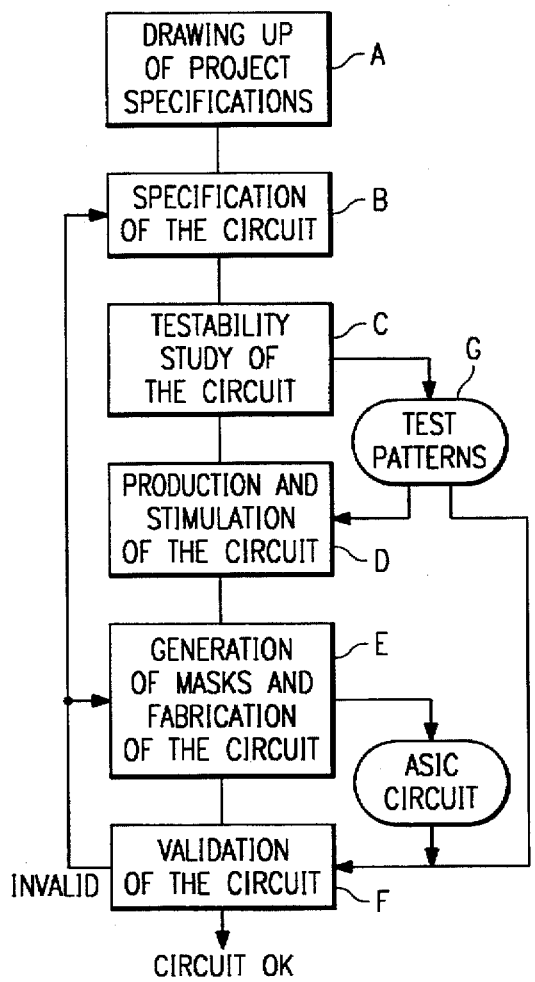
FIG. 2 is a flowchart of the development of a conventional ASIC circuit according to the prior art.
Figure 3:
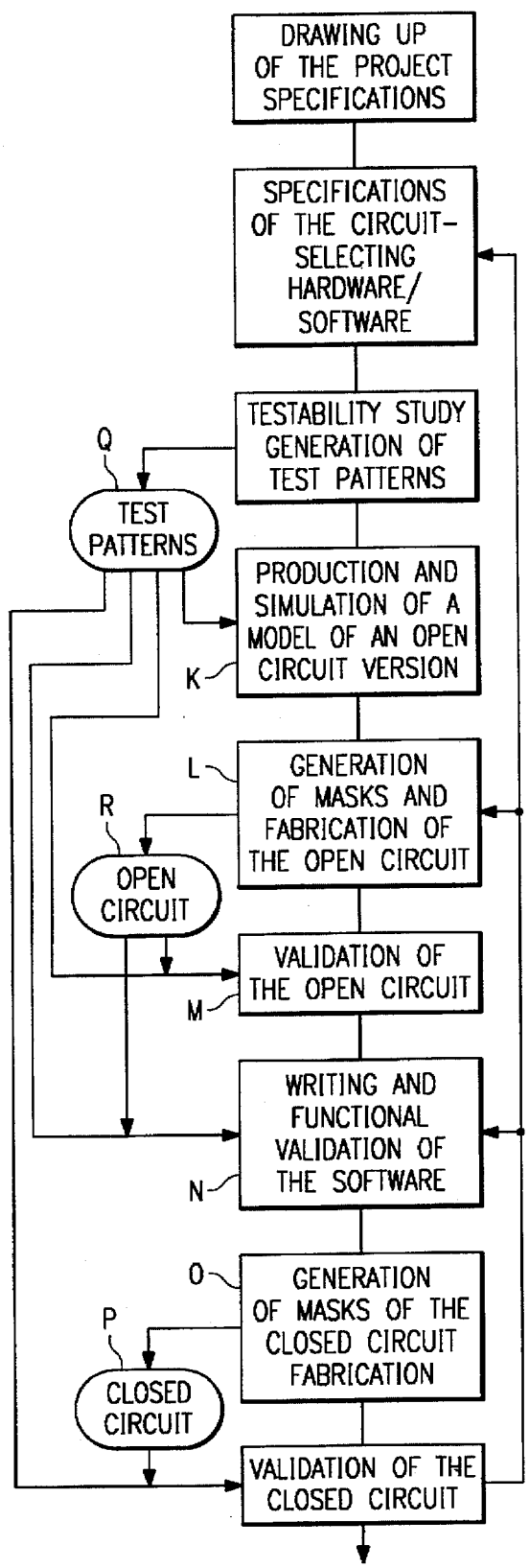
FIG. 3 is a flowchart of the development of a programmed ASIC circuit according to the prior art.

In FIG. 1, the dedicated ASIC-type integrated circuit 1 comprises a DSP microprocessor (Digital Signal Processor) 2, a ROM memory 3 intended to receive a program, a RAM memory 4 and various specific elements 5 to which input-output 6 of the integrated circuit are connected.

All these elements are intended to be integrated in a single circuit. In addition, each of these elements also exists in a corresponding discrete state. These discrete elements have already been completely tested independently of each other.

The hardware, management program and interactions between them are developed by simulation using a work station and test patterns (testability study).

Test Platform

A test platform circuit board is produced comprising:
a circuit fabricated around the DSP or microprocessor core;
RAM memory;
digital (and analog) data paths;
a management and test program (specific to the platform);
control logic;
and (optionally) peripherals intended to be integrated in the final circuit.

The processing program is then developed and tested on such a test platform, with the aid of the DSP core and test patterns.

Figure 4A:
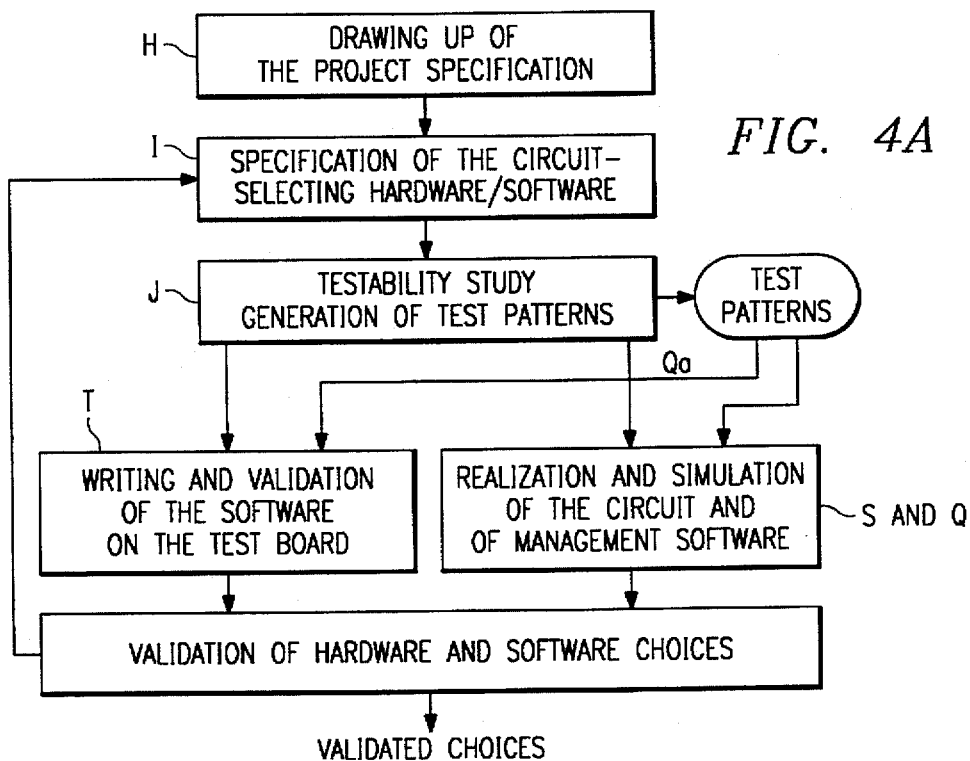
FIGS. 4A, 4B, and 4C show a process for development of the programmed ASIC circuit.
Figure 4B:
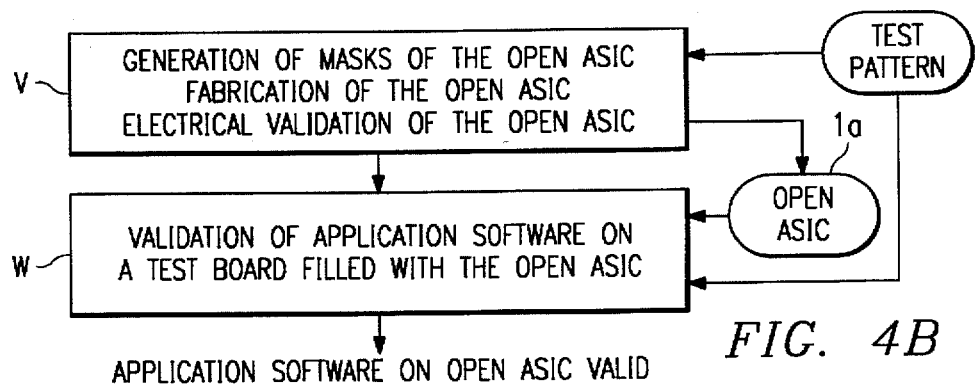
Figure 4C:
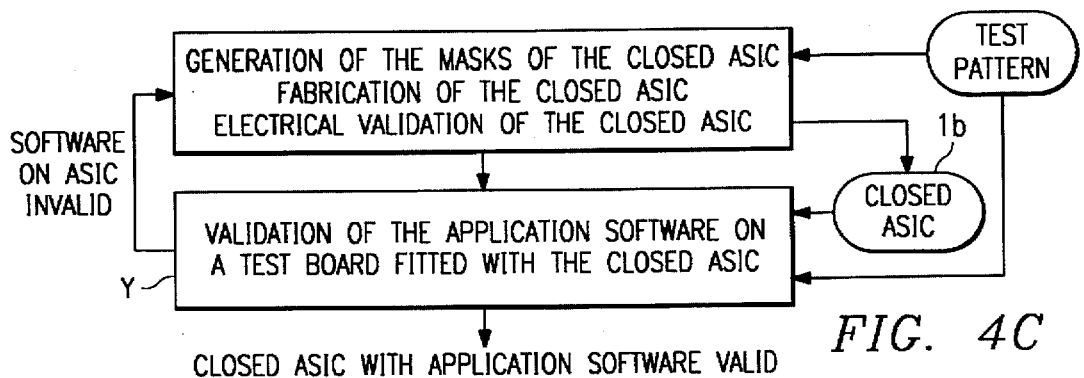

The programmed ASIC circuit is thus developed according to the following process, as shown in FIGS. 4A, 4B, and 4C:

drawing up of the project specifications according to constraints (overall dimensions, price, etc.) (H);
specification of the circuit corresponding to the project specifications.
Definition of hardware, processing program, management program (I);
hardware circuit and software testability study (J);
production and simulation of the circuit on a work station with the aid of the foundry library (manufacturer of the "hardware" circuit and test sequences defined by the testability study (S);
production and simulation of the management program on a work station with the aid of test sequences defined by the testability study (Q);
production of program modules and unit and global tests on a test platform with the aid of test sequences Qa defined by the testability study on the test platform (different from the final application) (T); and validation of the hardware and software decisions.

This validation permits the integration of the application program (including the processing software) with the management software.

The operations shown in FIG. 4B are then performed, to validate the application software in the open (trial) ASIC. To this end:

Masks are generated for the open circuit 1A, and it is manufactured. Electrical validation is then performed, using the test sequences Qb (V).

Validation of the application logic is then performed on a test platform, using the open ASIC (W).

The closed circuit 1b is then validated using the application software, as shown in FIG. 4C:

Masks are generated for the closed ASIC 1b. It is manufactured, electrical validation is then performed (X).

The application software is then validated, using the test sequences Qb, on a test platform using the closed ASIC (Y).

It should be noted that the operations (X) and (Y) must be repeated until the necessary validation has been obtained.

The realization of the hardware and management software may therefore be conducted simultaneously with the implementation of the processing logic. This saves time, and permits the optimization of the circuit (and correction of the specifications) until masks are generated.

Production of the hardware and the management program can, in this case, be carried out at the same time as production of the processing program modules. This saves time and allows the circuit to be optimized (correction of specifications) up until the time the masks are generated.

In one embodiment of the invention, and in particular where the peripherals of the final circuit cannot easily be emulated using discrete components, a second test platform can be produced, similar to the first but using a programmable version of the final circuit, so as to validate the management program other than by simulation. In this case, the peripherals, and possibly the control logic, are integrated in the circuit (programmable version of the final circuit.

In another particular embodiment, a third test platform is produced similar to the second, but using the final circuit (programmable) so as to allow the final circuit and its software (management and processing programs) to be validated independently of the final application. In this case:

the peripherals, and possibly the control logic, are integrated in the circuit; and the management software must be able to manage the test platform and the final application.

In this embodiment, the disclosed innovative teachings provide a process for developing a programmed ASIC circuit in which a specific test platform is produced with a circuit fabricated from the core of the programmable circuit for the writing and testing of the processing program, different from the final application, so as to be able to develop this program before the ASIC circuit is available and avoid producing masks for the open circuit.

A test platform is produced comprising:

a circuit fabricated using the core of the DSP (or microprocessor);

RAM memory and/or ROM memory;

digital (and analog) data paths;

a management and test program (specific to the platform);

control logic;

possibly peripherals to be integrated in the final circuit.

The circuit fabricated using the core of the DSP (or microprocessor) allows development of the processing program and testing of its functions with the aid of test patterns before the final programmed circuit is available (see use of the card for the validation and non-regression tests).

The RAM memory allows easy loading of programs and their coefficients and is used as a work zone. The ROM memory can be used to replace a part of the RAM memory in order to store and test a particular program version (archiving).

The digital data paths are used by the management program to send the data needed by the processing program, and the application would do, and to recover the responses from this processing program in digital form. Analog paths can be added in order to acquire signals that can be placed in test bases and to restore signals originating from the processing program.

The platform's management program allows activation and deactivation of test and display points defined in the processing program, the display of the memories and main registers of the core of the DSP (or microprocessor), and execution of the processing program in and outside real time (to validate it).

The platform's control logic, which allows the core of the DSP (or microprocessor) to be configured and orders to be sent to it, must be similar to that of the final application, in order to be able to emulate as closely as possible the demands made by the application on the software.

In many cases, some of the peripherals to be integrated in the final circuit are available, or can be produced simply with the aid of discrete components (serial links, analog-to-digital/digital-to-analog converter, etc.). By functionally emulating these peripherals, the software operation obtained (management+processing programs) on the test platform is close to that obtained on the application.

A test platform is advantageously produced using a programmable version of the final circuit (i.e. with RAM instead of ROM, but with all the peripherals) so as to test the management program other than by simulation.

Preferably, a test platform is also produced using the final circuit in order to test this circuit independently of the final application. This platform will use the same control logic as the final application so that the management program can manage the test platform and the application. In this case, the peripherals, and possibly the control logic, are on the final circuit.

A management program is produced which allows access to the resources of the test platform, activation of test and display points defined in the processing program, display of memories and main registers of the core of the DSP (or microprocessor), and execution of the processing program in and outside real time (to validate it).

This platform is preferably controlled from a microcomputer via an interface program which will manage the platform's resources and dialogue with the management program. This interface program also allows validation and automatic non-regression control of the processing program with the aid of predefined digital test patterns stored on the microcomputer's hard disk. This interface program can also emulate a part of the application acting on the circuit (a microcontroller with its software for example).

A microcomputer interface program is produced which besides giving access to the resources of the test platforms, also allows validation and automatic non-regression control of the processing program using digital test patterns stored on the microcomputer's hard disk. This interface program can also emulate a part of the application acting on the circuit (for example a microcontroller with its software).

For example, a test platform (board PC-ST932) has been produced from the DSP core ST18932. On this platform, the data digital paths are produced by FIFOs (First-In First-Out shift register), the control logic includes a mailbox, and a telephony-dedicated digital-to-analog and analog-to-digital converter is added. Auxiliary converters are used to display signals on an oscilloscope.

Figure 5:
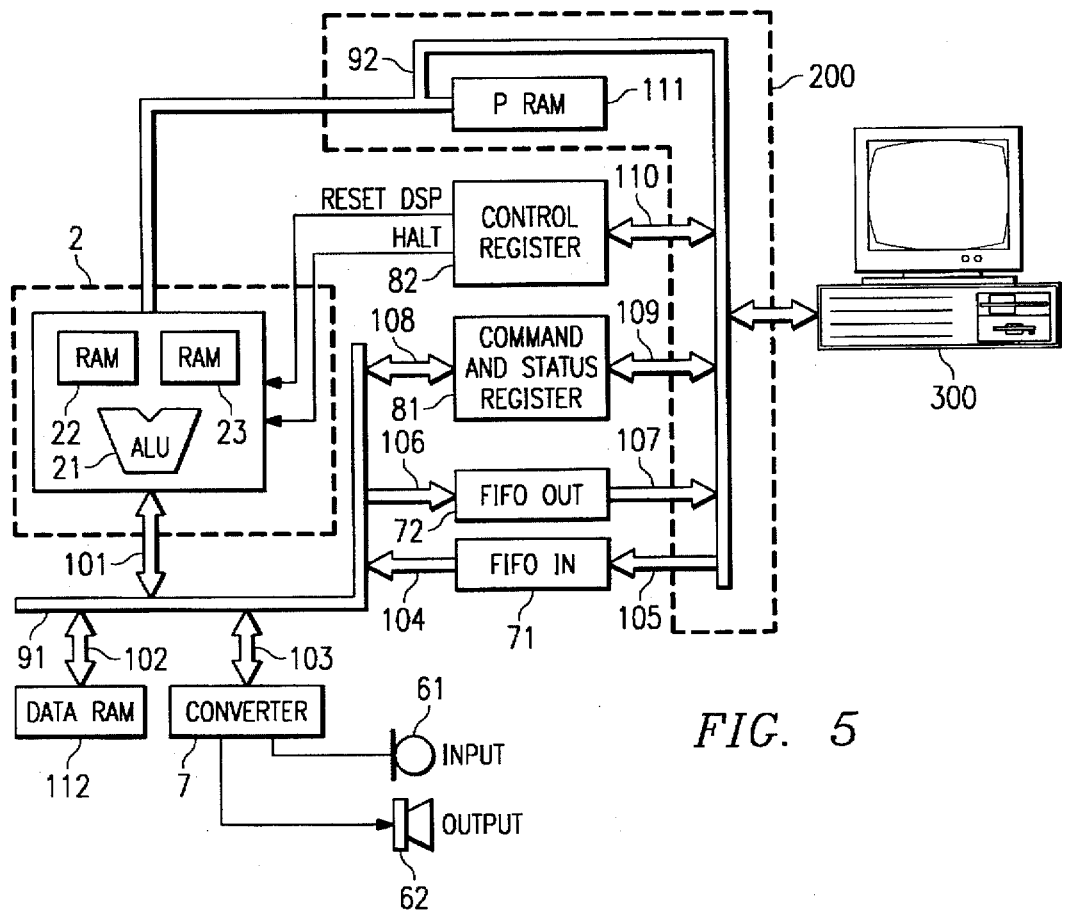
FIG. 5 is a functional schematic drawing of a test platform according to the invention comprising a DSP core.
Figure 7A:
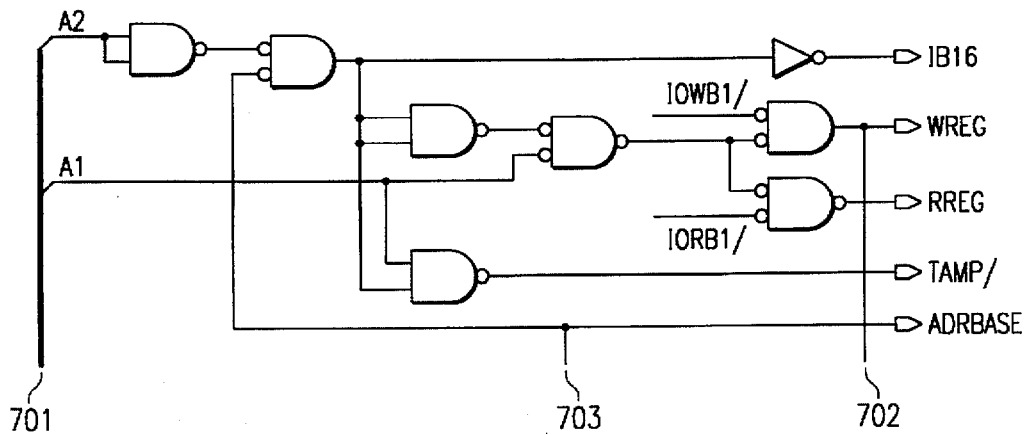
FIGS. 7A and 7B are detailed drawings of the PC interface bus.

This test platform is shown in FIG. 5. In this Figure, integrated circuit 2 is represented by its arithmetic logic unit (ALU) 21 and RAM memories 22 and 23. The integrated circuit 2 is connected to:

an on-board read-write memory 112, emulating RAM 4, which is used to store data, and an on-board read-write memory 111 emulating ROM memory 3 which allows the software to be loaded.

FIFO (First-In First-Out) registers 71, 72 ensure transfer of data, first, from the DSP to the microcomputer 300, and secondly, from the microcomputer 300 to the DSP 71. Emulation of Parts 5 and 6 (of the ASIC organization of FIG. 1) are handled by a converter 7 ensuring the link with the input-outputs 61, 62, and by a command and status register 81, which allows dialogue with microcomputer 300 or with another microprocessor. A control register 82 enables the working of the test platform to be controlled from the microcomputer 300. The on-chip elements of chip 2 communicate with the other elements of the integrated circuit over a local bus 91. An interface bus 92 is used to load software from the microcomputer into RAM memory 111 and to exchange data between the integrated circuit 2 and the microcomputer.

The different elements of the integrated circuit are linked to data buses 91 and 92 by interfaces 101 to 110. The DSP/integrated circuit 2 is linked to the local bus 91 by interface 101. The external read-write memory 4 is linked to the local bus 91 by interface 102. Converter 7 is linked to the local bus 91 by interface 103. FIFO input register 71 is linked to the local bus 91 by interface 104. Local bus 92 is linked to the FIFO input register 71 by interface 105. FIFO output register 72 is linked to the local bus 91 by interface 106. The PC interface local bus 92 is linked to the FIFO output register 72 by interface 107. Command register 81 is linked to the local bus 91 by interface 108. Bus 92 is linked to the command register 81 by interface 109. Bus 92 is linked to the control register 82 by interface 110.

Microcomputer 300 can also be used with the interface software to produce the software tests which are to be stored in ROM memory 3. These tests are usually produced on a work station with the aid of a VHDL model of the circuit and require lengthy processing times. Using the emulation structure shown, these tests can in addition be performed in real time, which is not possible when the circuit is simulated with a model.

In a first step, an executable file is generated (optionally using this microcomputer 300), from the source code of the software that is to be stored in ROM memory 3. This executable file can then be loaded by microcomputer 300, from hard disk (or diskettes, optical disk, etc.) into read-write memory 111, which emulates ROM memory 3.

The interface software can then be used to chain the different tests and to compare the results obtained with expected results stored in the test base, in order to validate the software to be stored in ROM memory 3 independently of validation of the final application.

A sample embodiment of this test platform, which was produced from the DSP ST18932 core, is shown in detail in FIGS. 6 to 17. FIGS. 6A and 6B shown an overall diagram of this platform, and FIGS. 7 to 17 detailed diagrams of each component element.

Connections are marked in the customary manner using the same name for the pins of two components linked by an electric connection.

Multiple and parallel connections are marked by their name followed by an opening bracket, a zero representing the first link, two periods followed by the number of the last link, and then a closing bracket, for example DPC[0 . . . 15], PDSP[0 . . 7], etc.

Figure 6A:
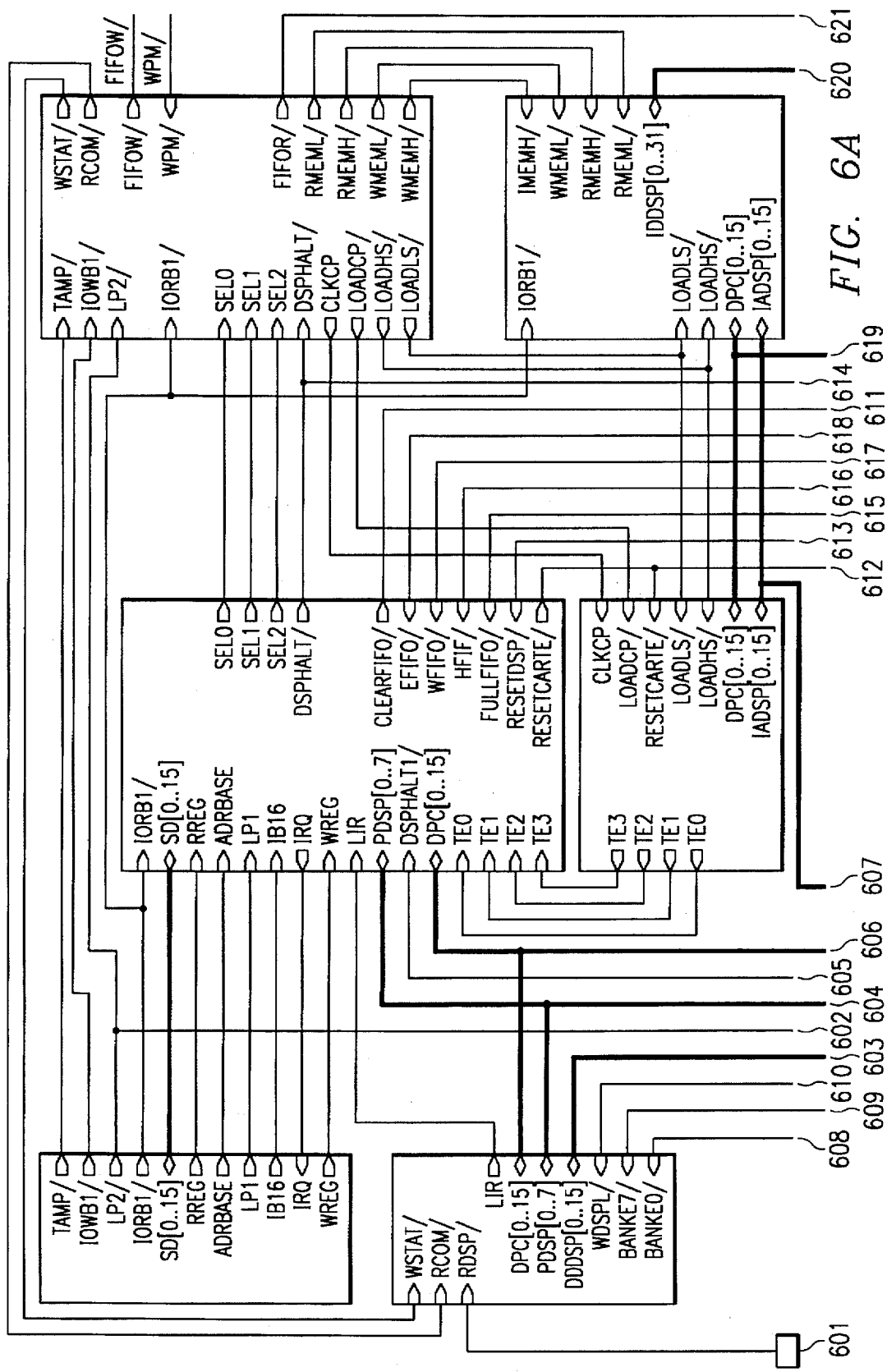
Figure 7B:
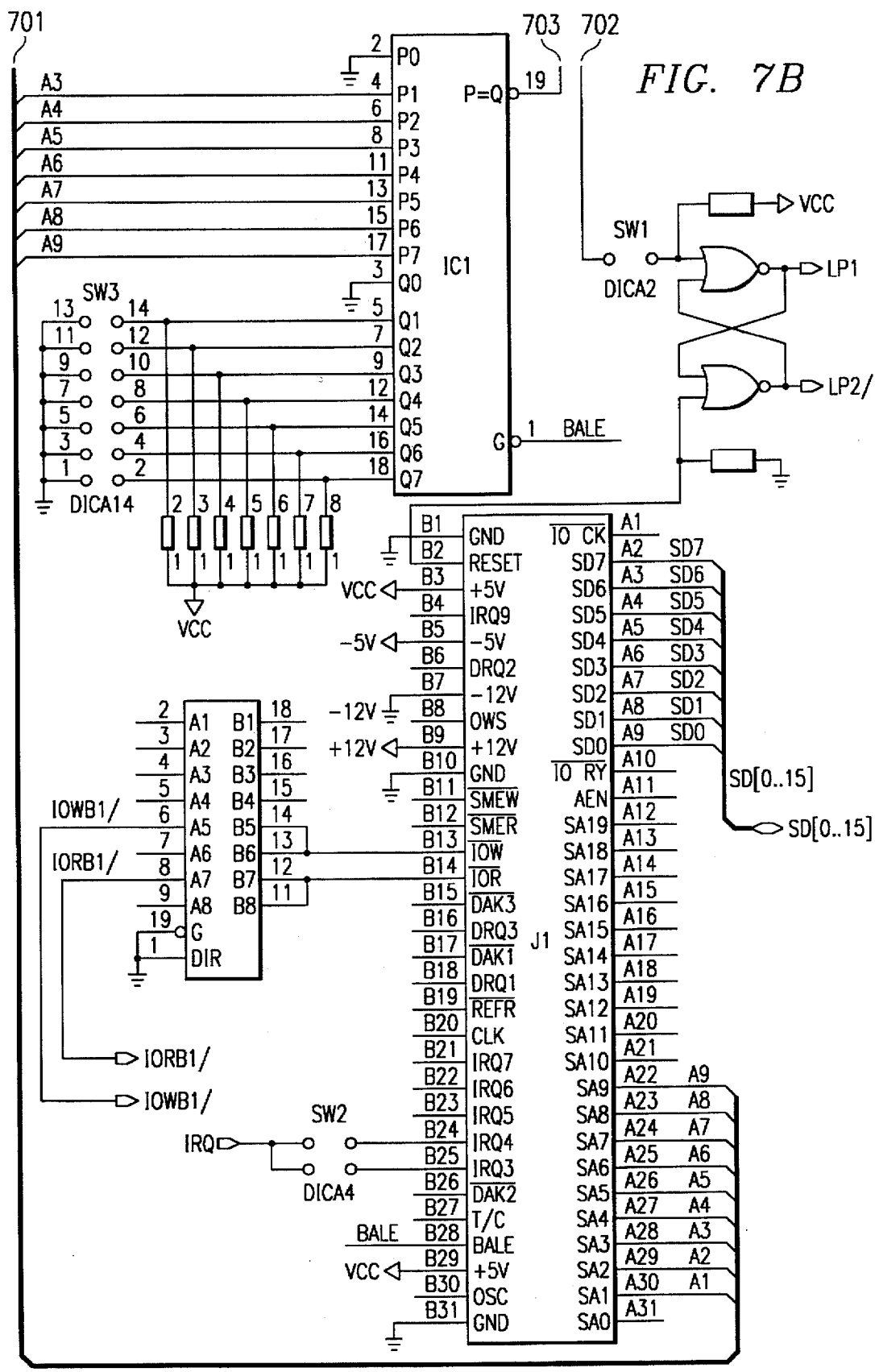
Figure 8A:
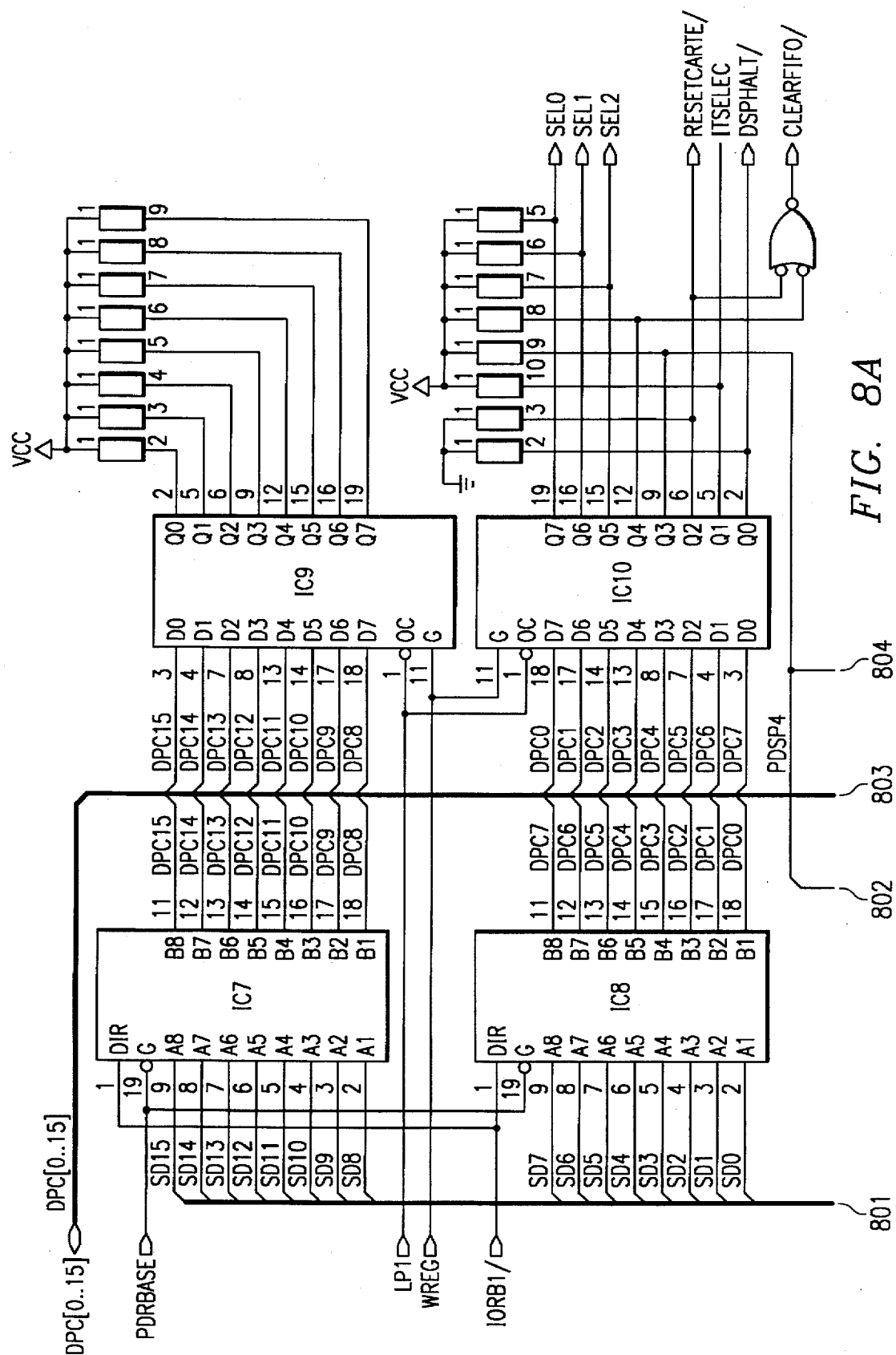
FIGS. 8A and 8B are drawings of a first part of the control register.
Figure 8B:
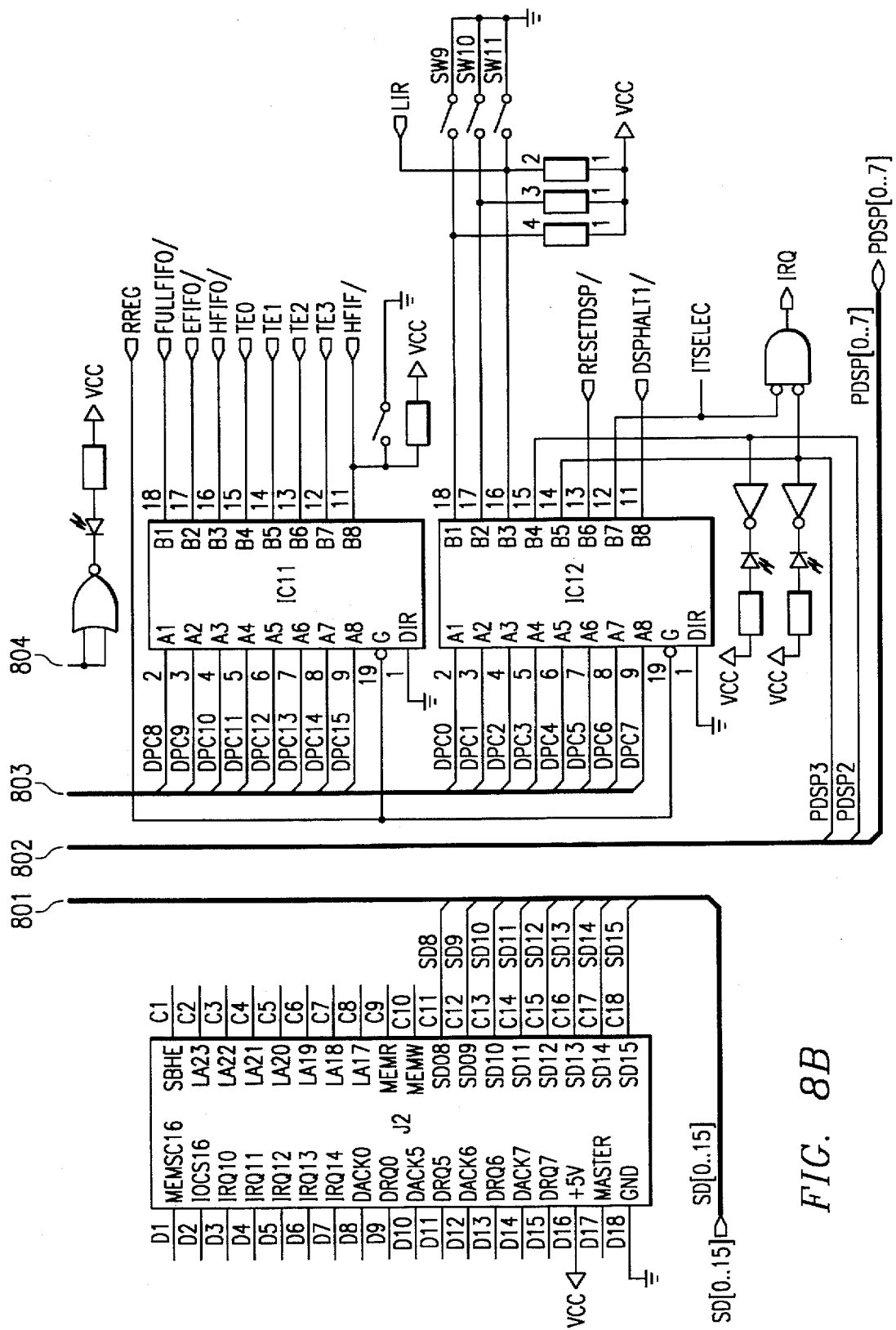
Figure 9A:
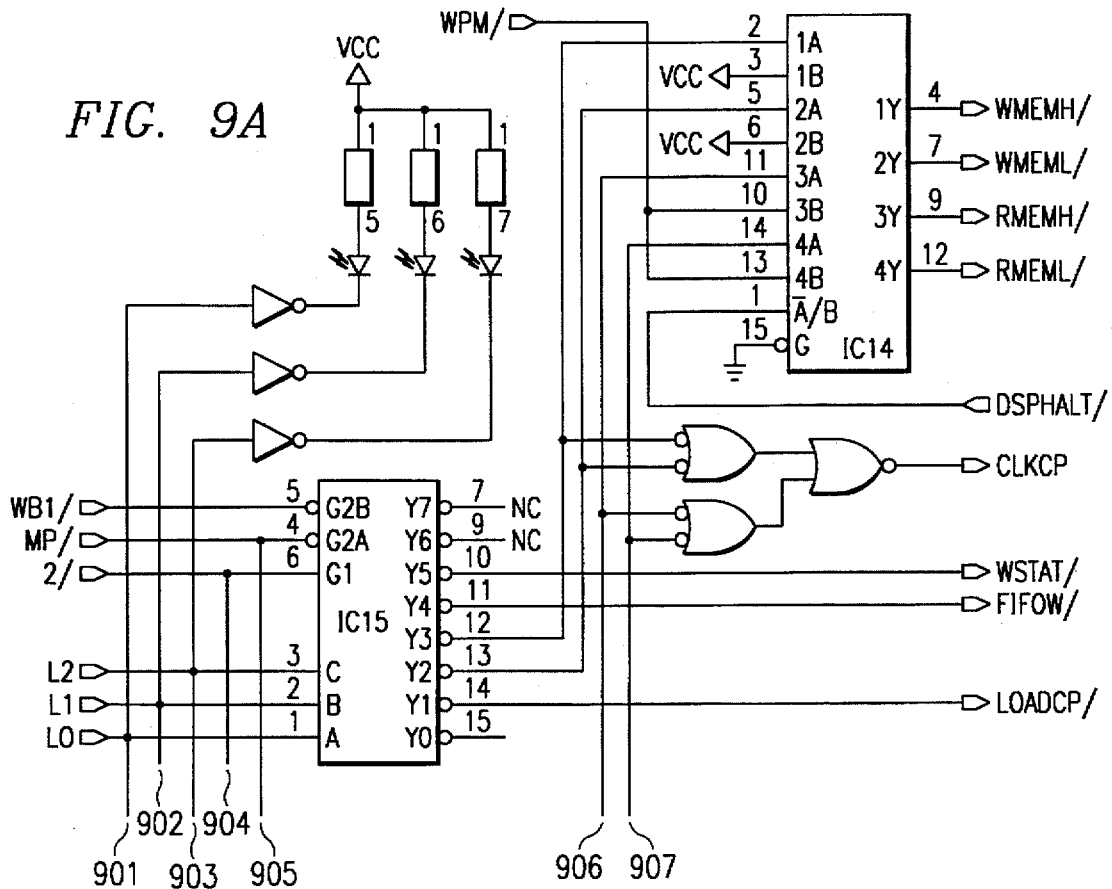
FIGS. 9A and 9B show the decoding module of the control register.
Figure 9B:
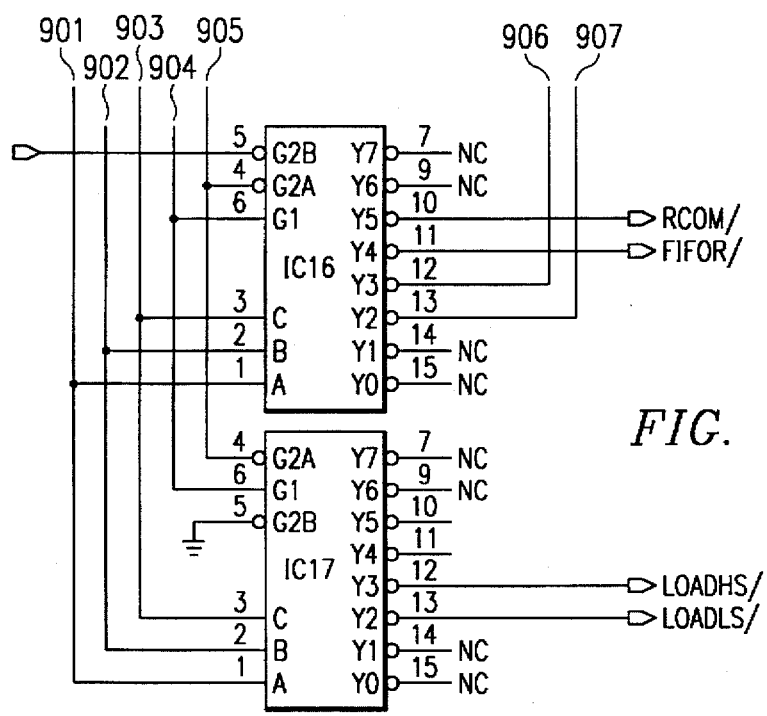
Figure 10A:
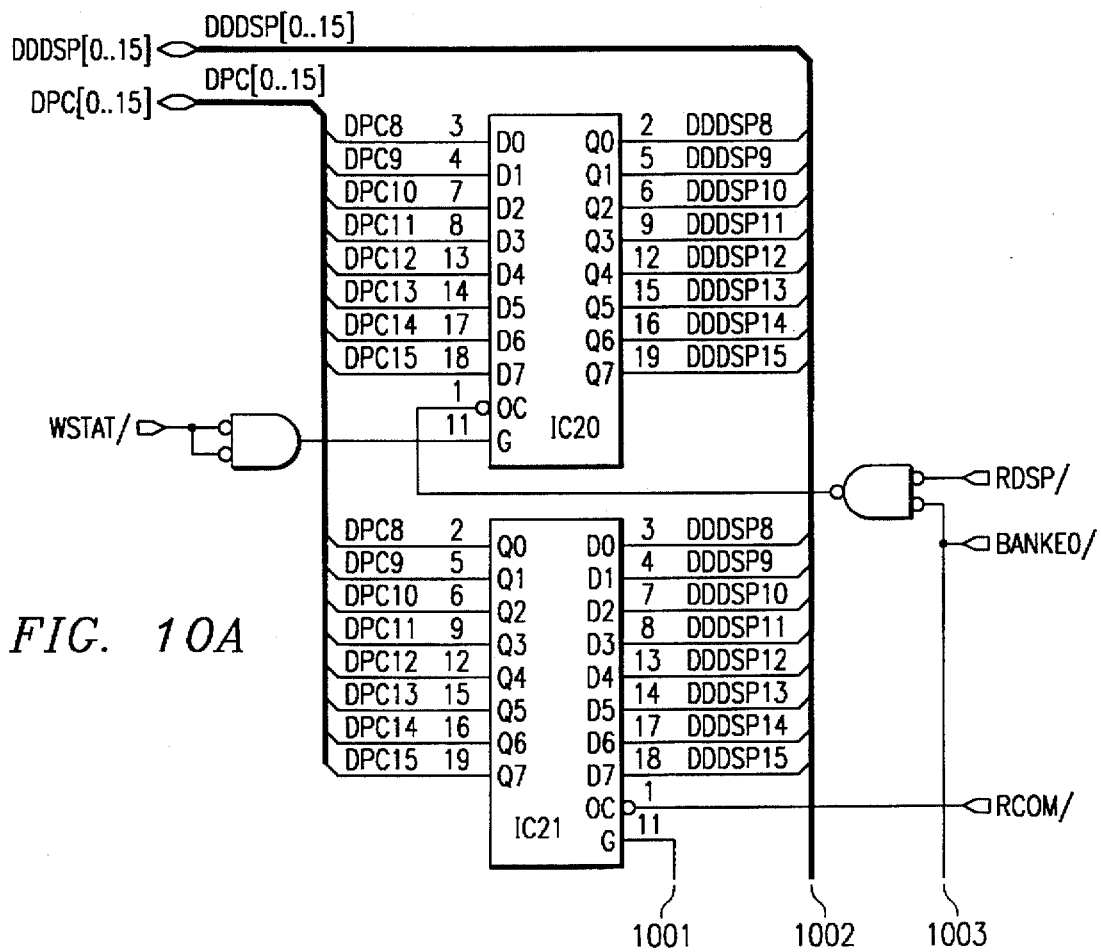
FIGS. 10A and 10B show the command register.
Figure 10B:
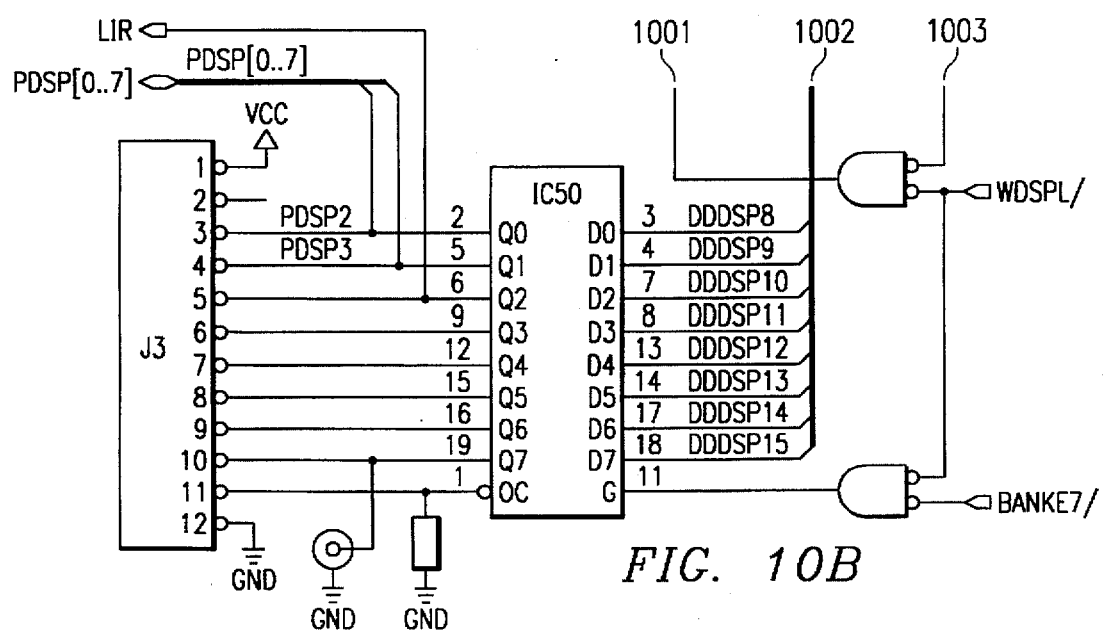
Figure 11A:
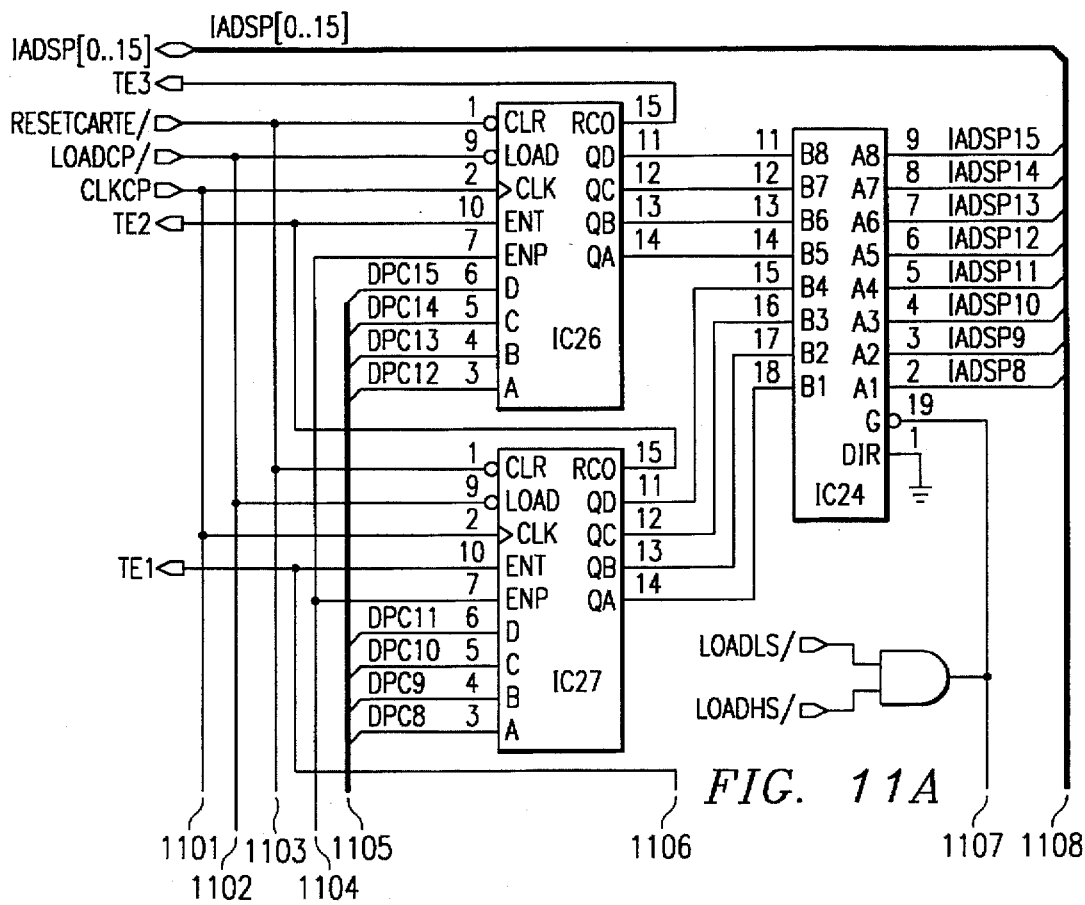
FIGS. 11A and 11B show the address generator of the PC interface.
Figure 11B:
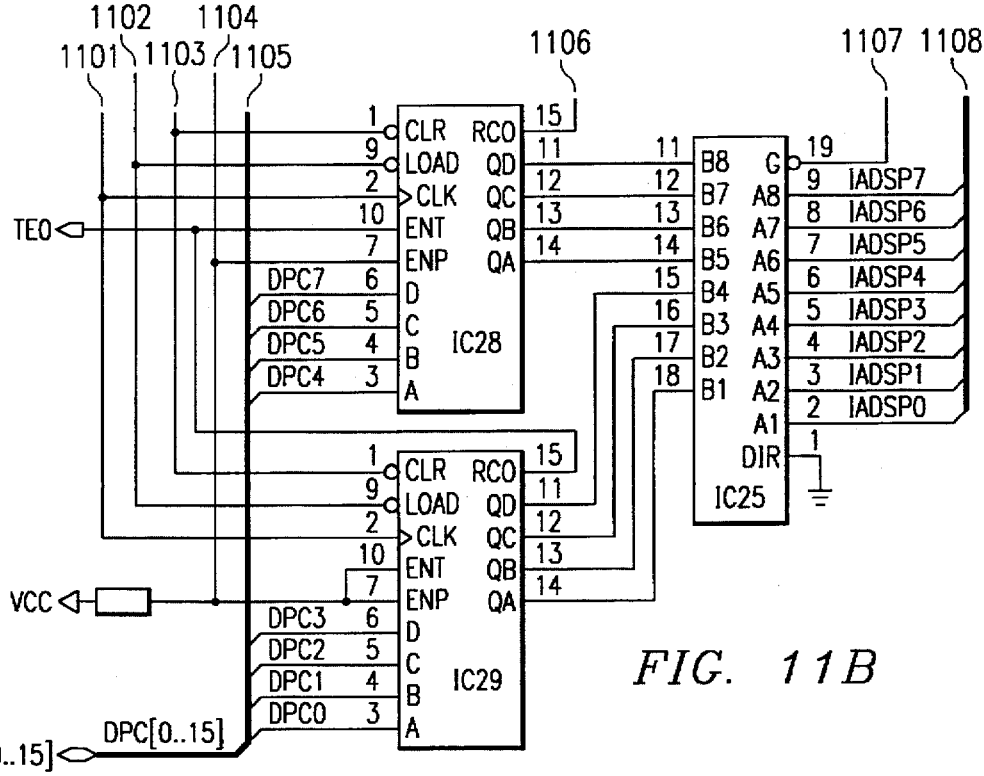
Figure 12A:
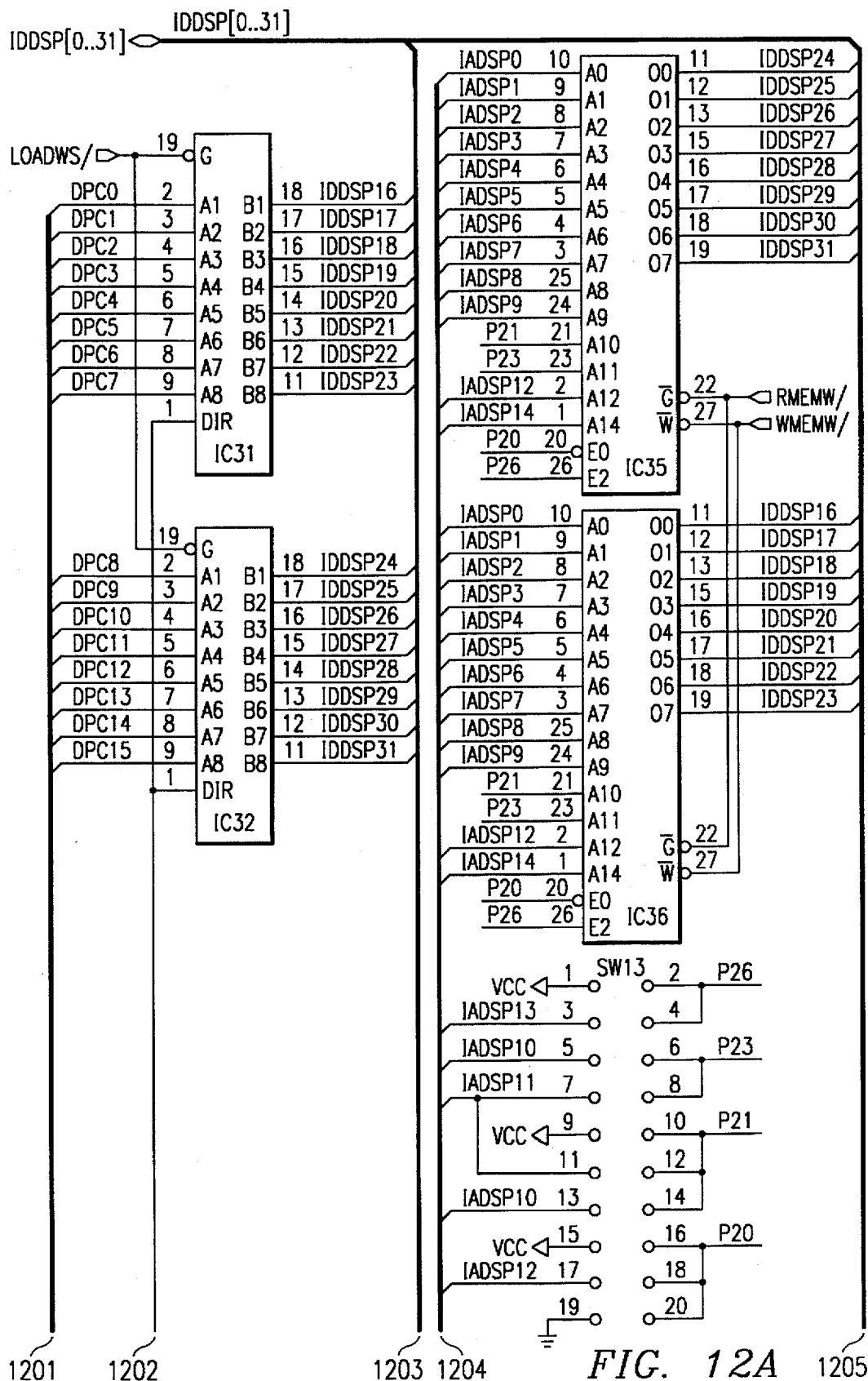
FIGS. 12A and 12B show the RAM memory.
Figure 12B:
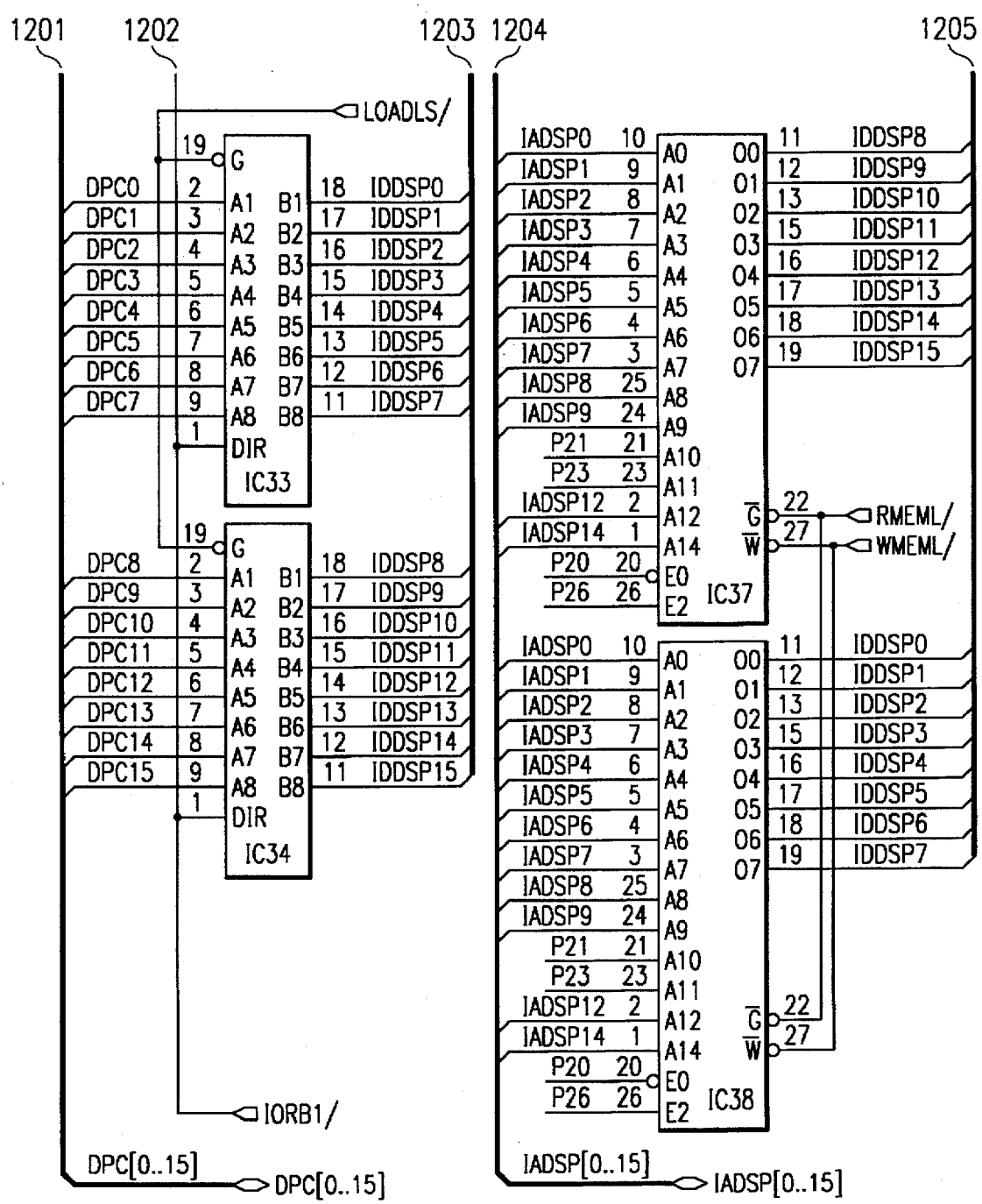
Figure 13A:
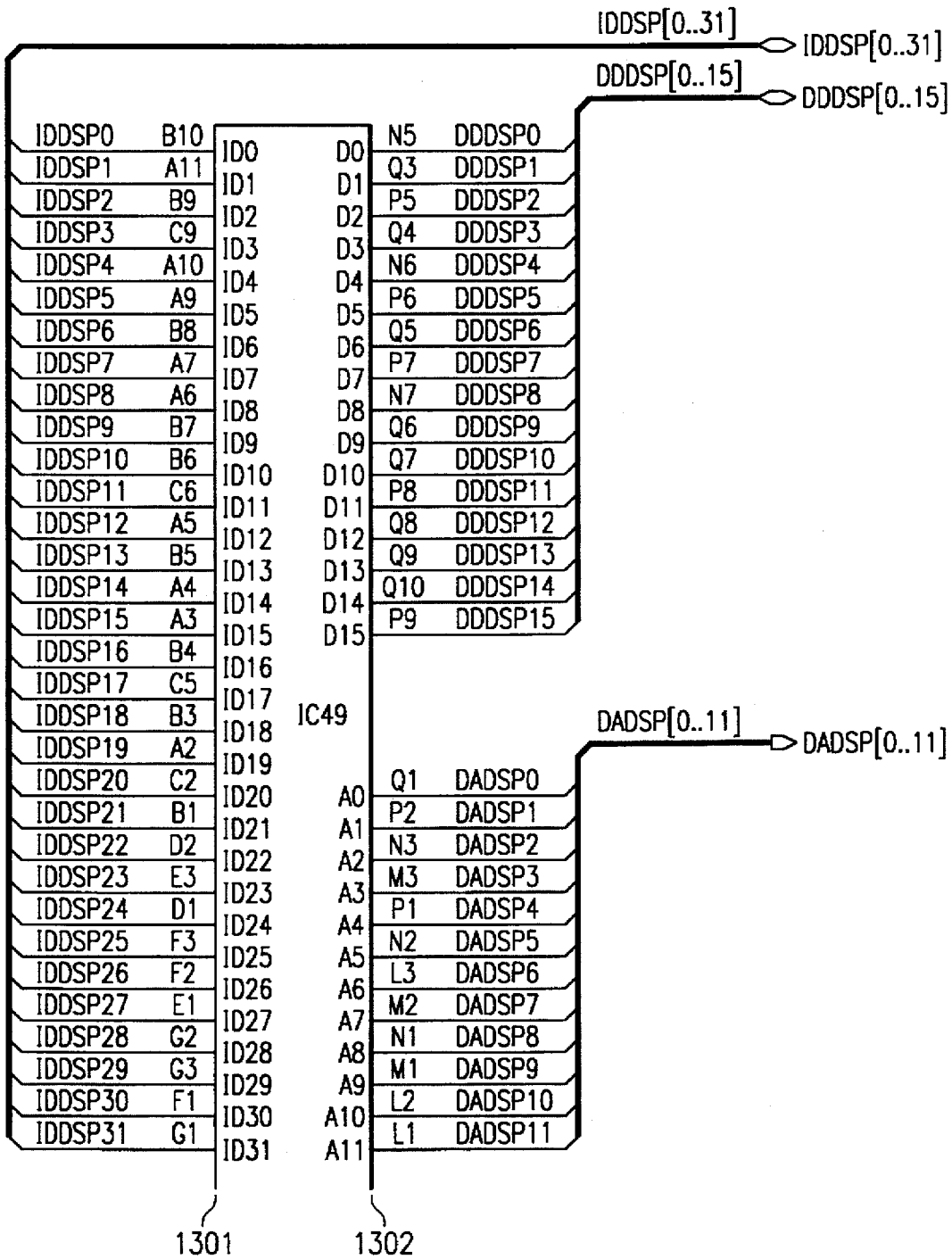
FIGS. 13A and 13B show the microprocessor.
Figure 13B:
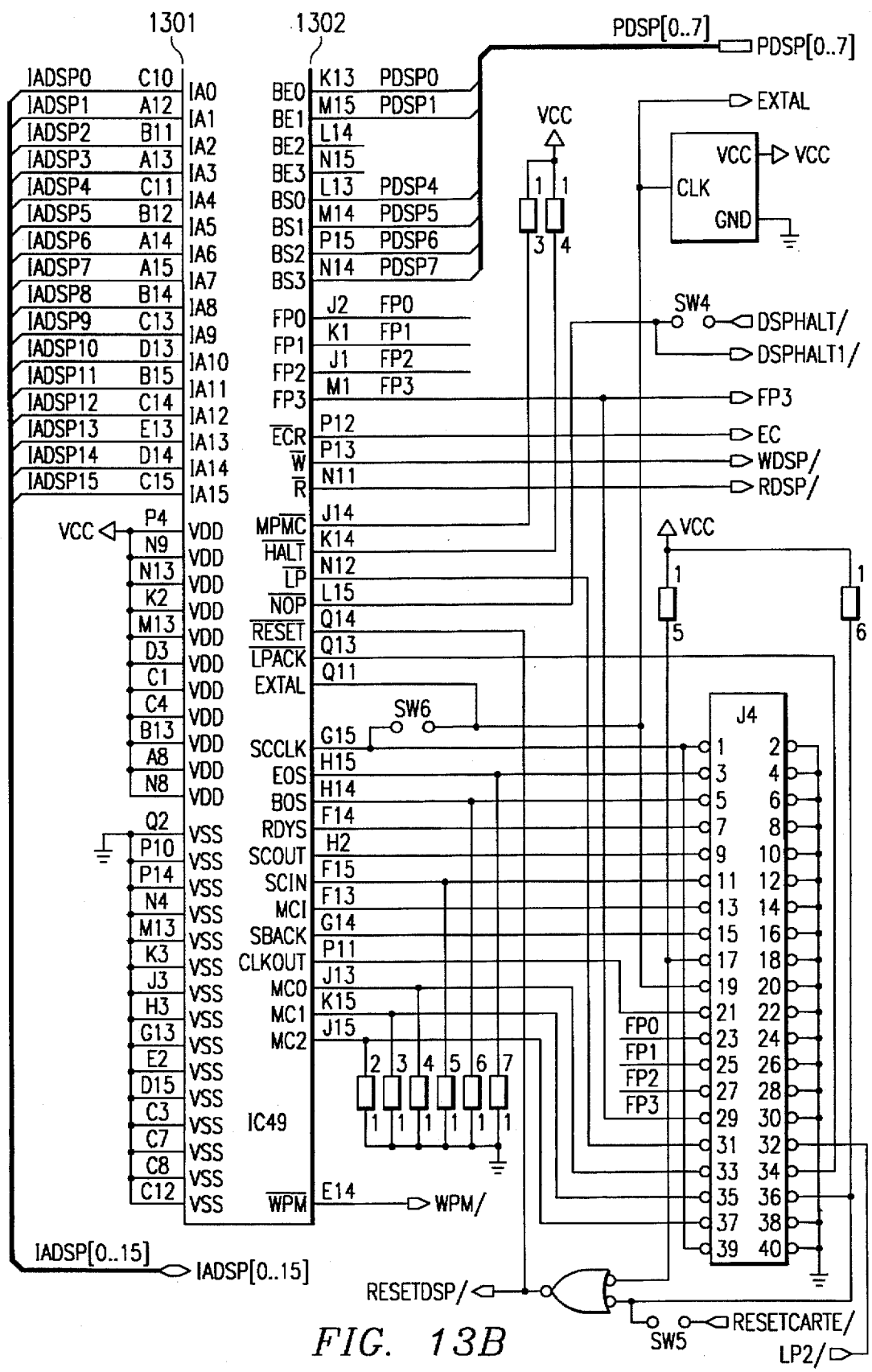
Figure 14A:
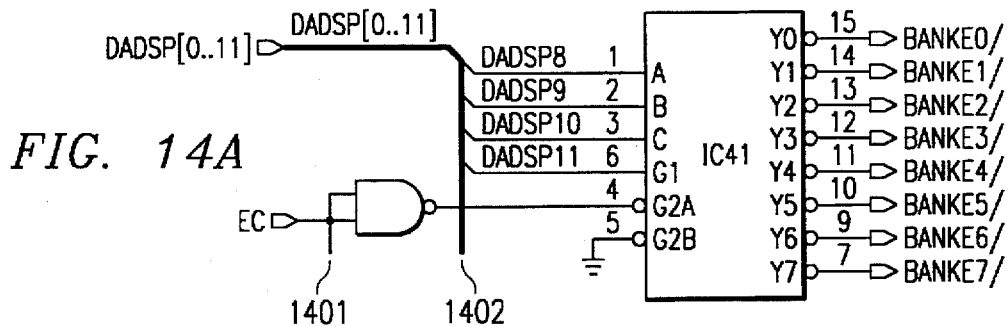
FIGS. 14A and 14B show the address decoding module of the DSP.
Figure 14B:
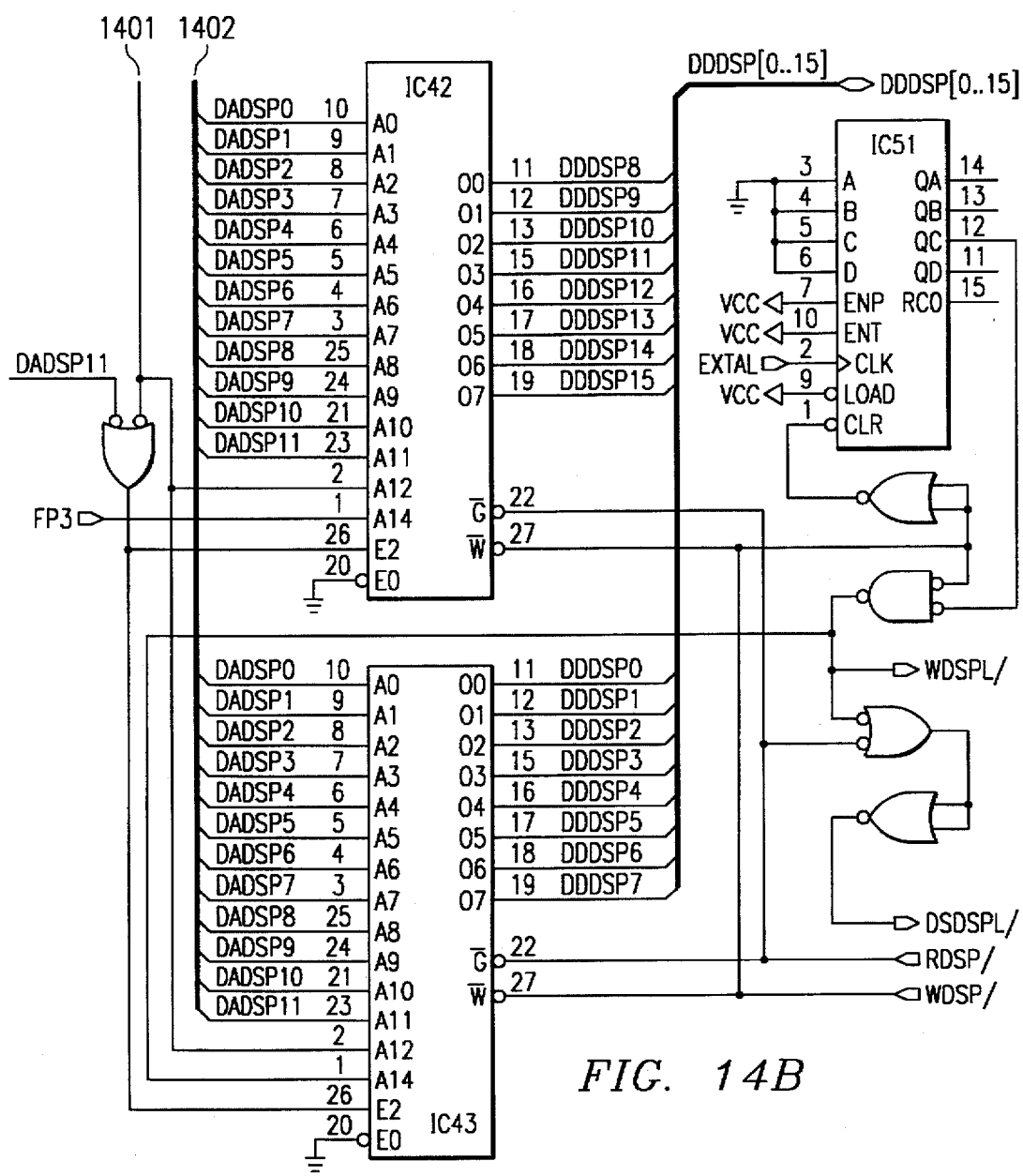
Figure 15:
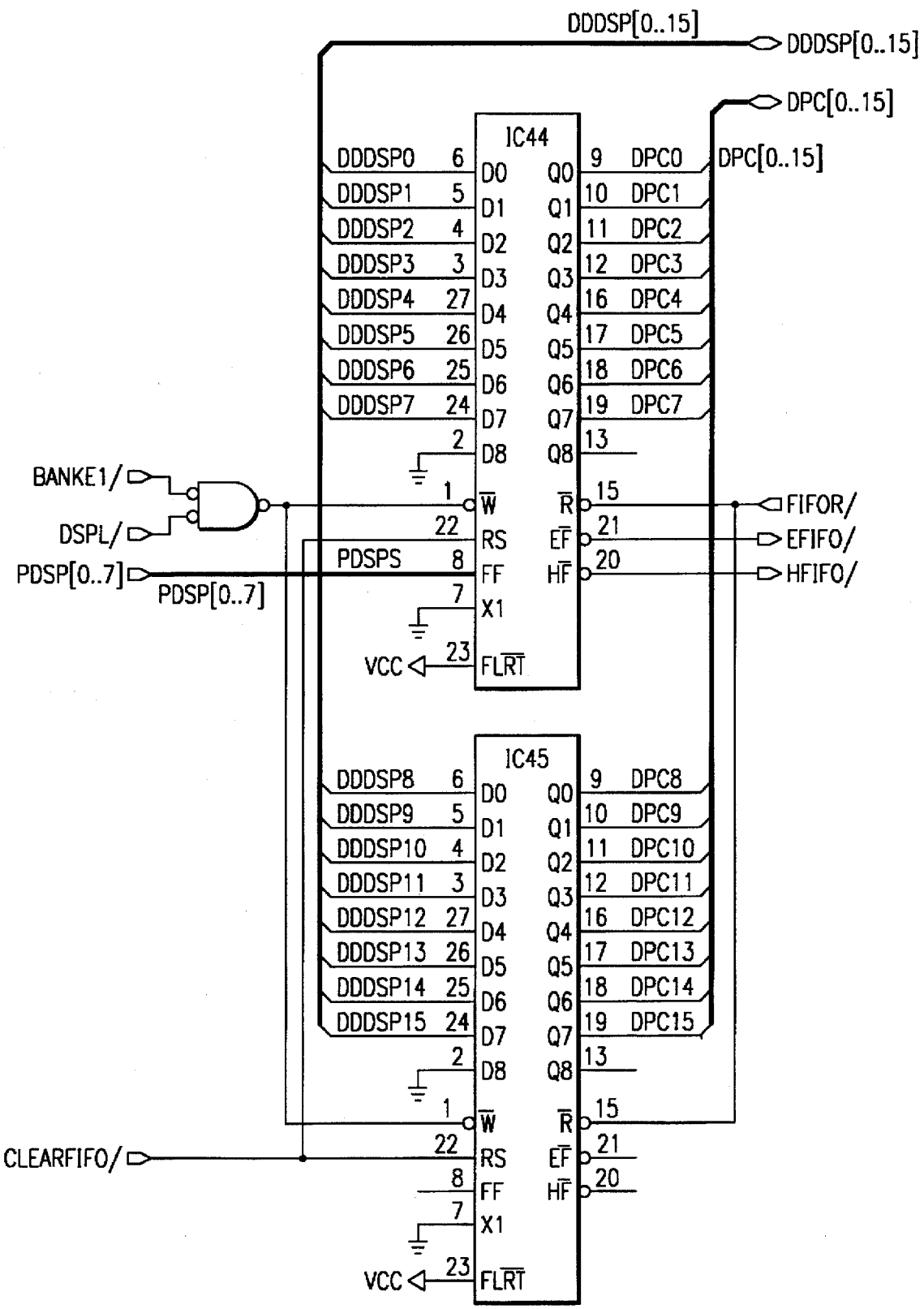
FIG. 15 shows the output register.
Figure 16:
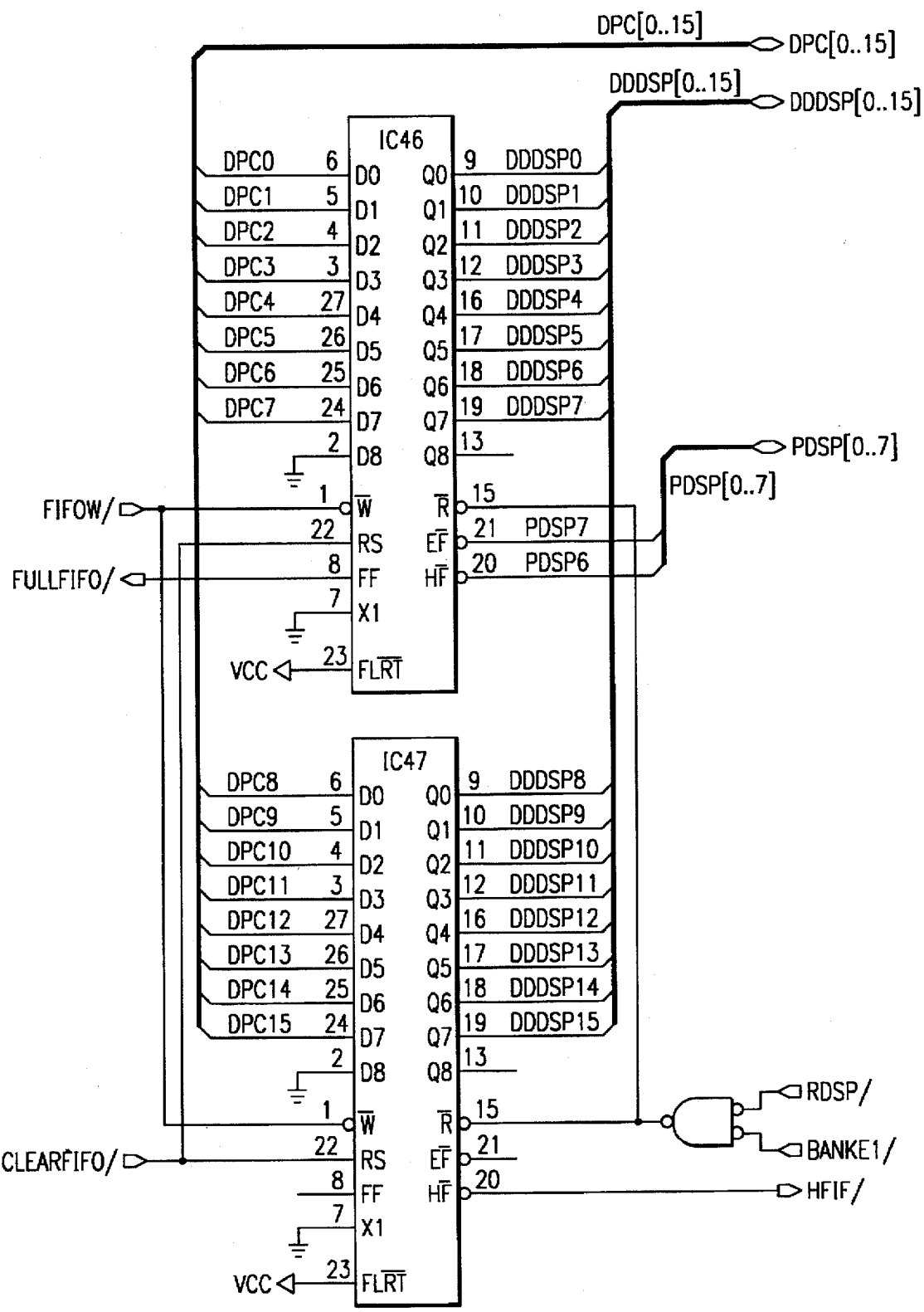
FIG. 16 shows the input register.
Figure 17A:
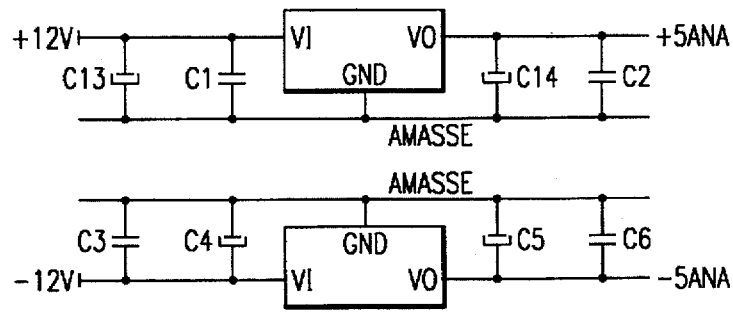
FIGS. 17A and 17B show the converter.
Figure 17B:
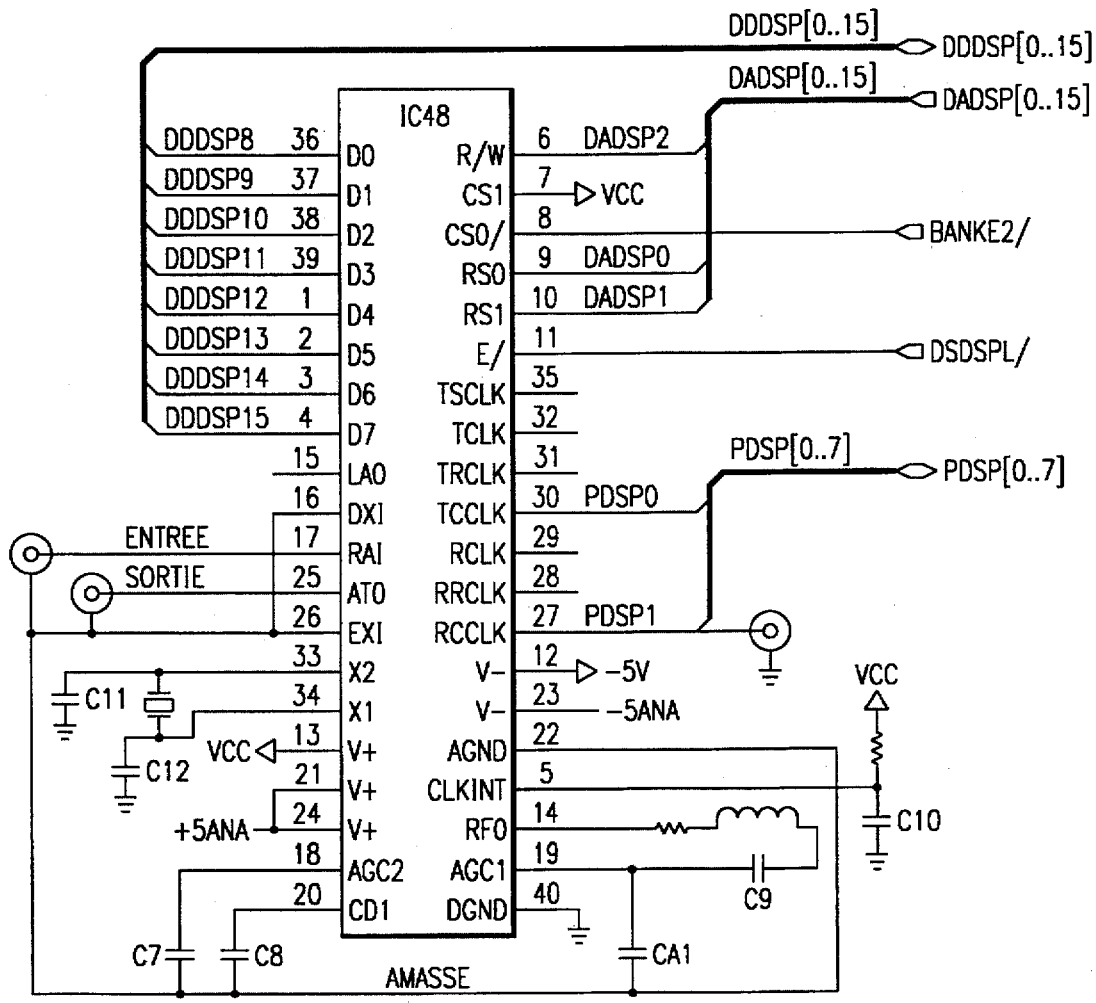
Figure 18:
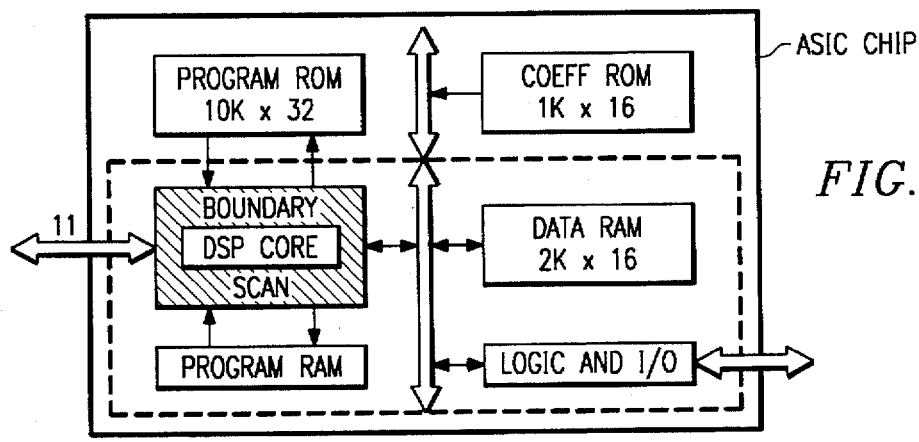
FIG. 18 shows a high-level block diagram of an ASIC, incorporating a DSP core, according to a sample preferred embodiment.
Figure 20:
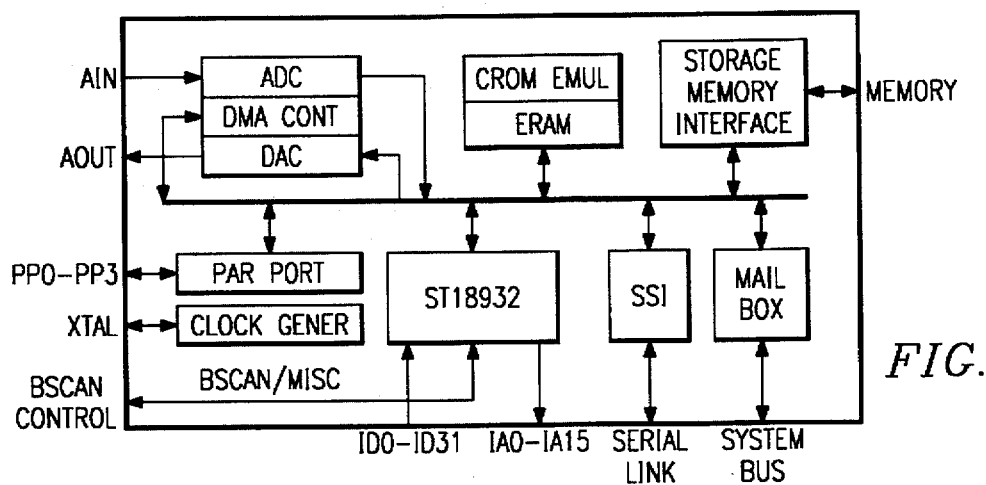
FIG. 20 is another block diagram of a sample test platform using a DSP core like that of FIG. 18.
Figure 21:
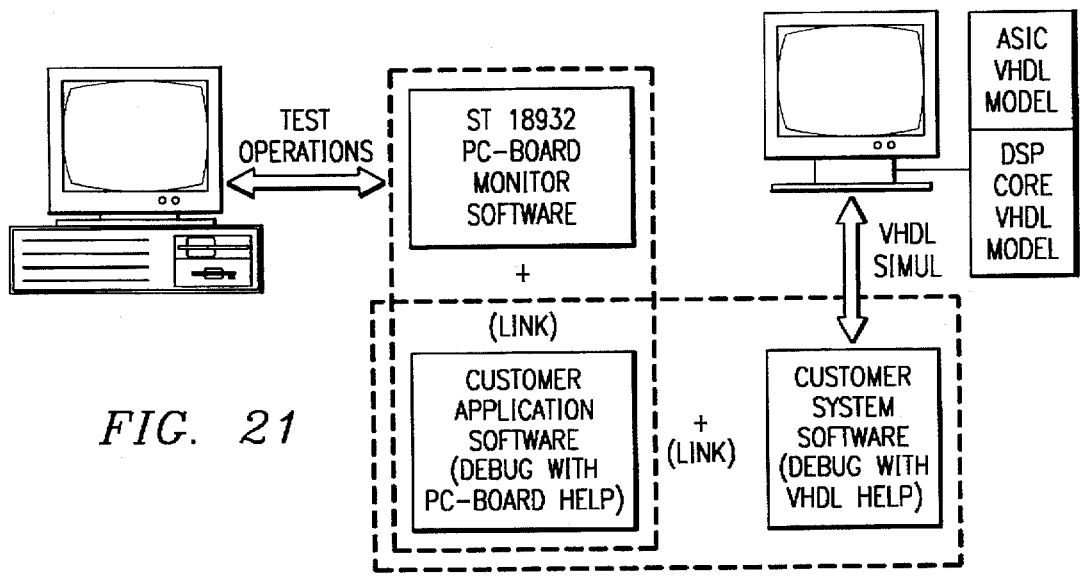
FIG. 21 provides a high-level symbolic representation of the relations of different debugging operations to the various computers which may be used by designers.
Figure 19:
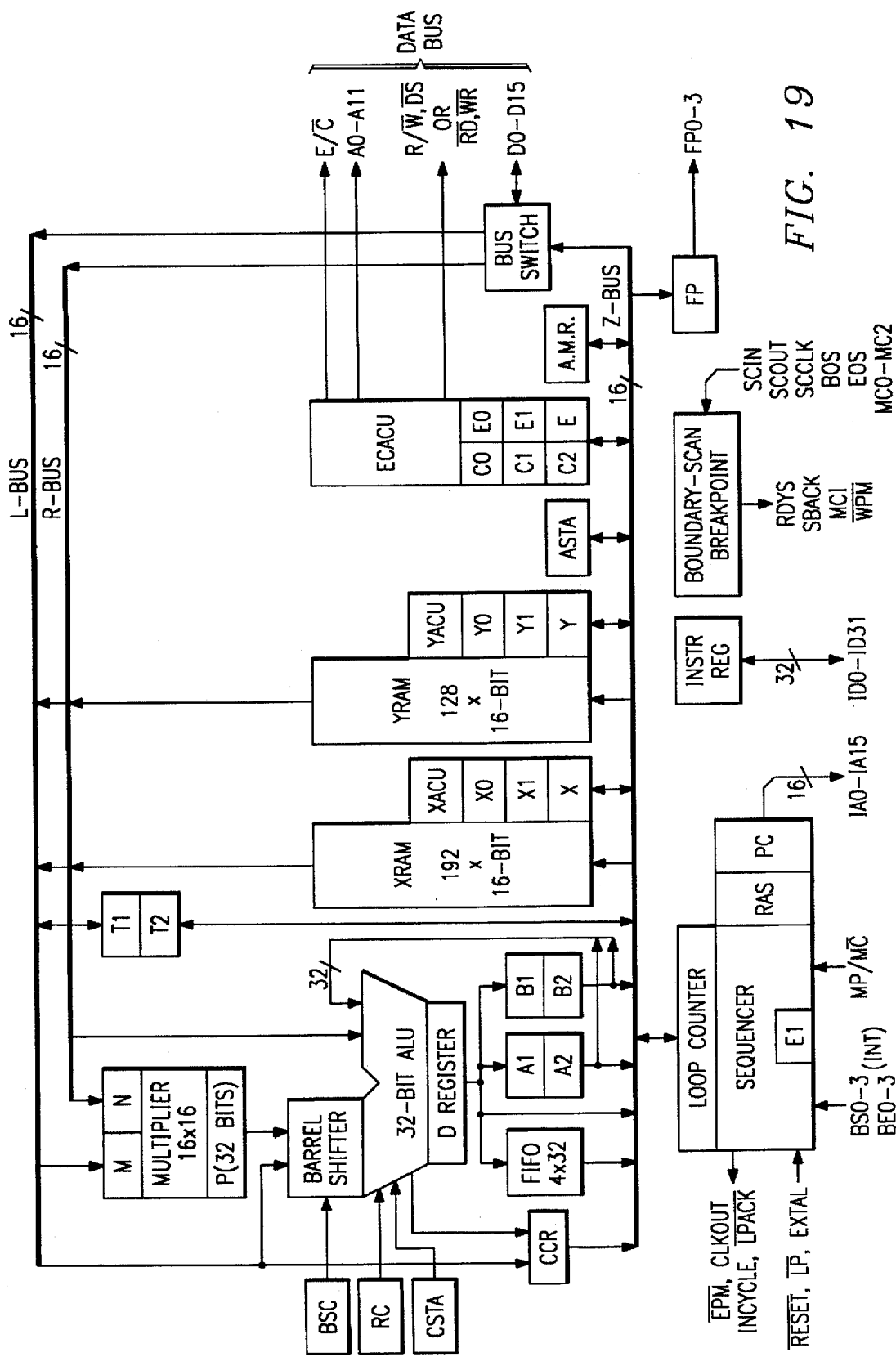
FIG. 19 shows a block diagram of the DSP core of FIG. 18.
Figure 22:
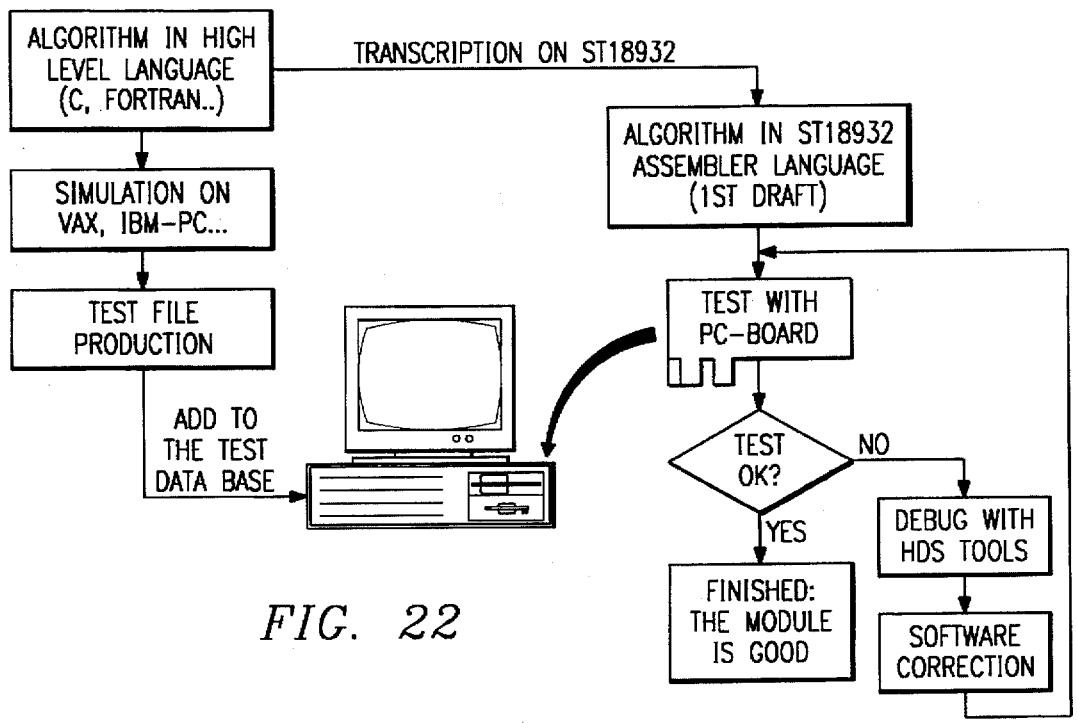
FIG. 22 is a very simple representation of an innovative development process according to certain embodiments of the invention.
Figure 23:
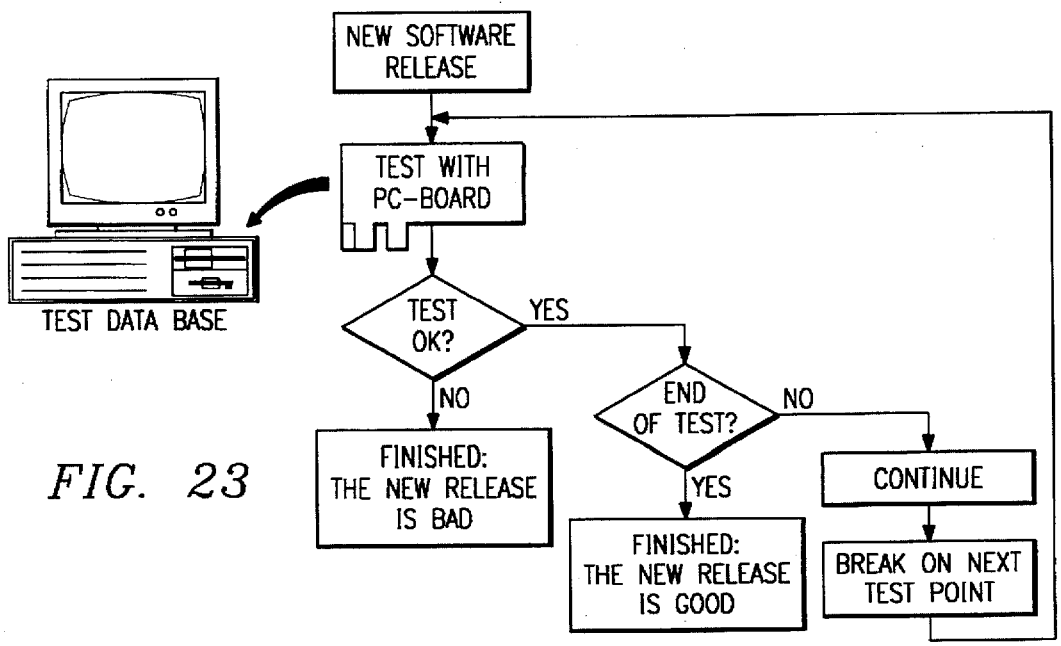
FIG. 23 is a corresponding diagram showing a simplified flow which can be used to test software updates.

In FIGS. 6A and 6B, the components are marked with the same references as shown in FIG. 5, i.e. 2 for the DSP, 7 for the converter, 72 for the output register and 71 the input register.

Given the different diagrammatic representations, some functional elements in FIG. 5 do not correspond to a single equivalent in FIGS. 6A and 6B.

For example, the functions of bus 92 are partially filled by the PC interface 120 and by address generator 121. Likewise, the functions of control register 82 are partially filled by register 122 and by decoding device 123. In the same way, the address decoding device of DSP 124 is not shown in FIG. 5.

In detailed FIGS. 7 to 17, the reference of each component is attached to the upper part of the sign representing it and its type to the lower part. The component type references, in this illustrative sample embodiment, are commercial references used by SGS-THOMSON. However, of course, a wide variety of other specific parts could be used. In this example: HCT245 is a 3-state bus transmitter; CD represents capacitors whose value is specified on the schematics; SW13 represents a set of 20 pins; MEMP is a RAM memory; HCT373 is a 3-state flip-flop; HCT32 is a logic function; HCT02 is a NOR logic function; MK4503 is a First-in First-out register; HCT161 is a binary counter; SIL2 is a resistor array; PCATBUS is the bus connector of an IBM-PC AT-compatible microcomputer; 7405 is an open-collector inverting buffer; HCT157 is a multiplexer; HC08 is an AND logic function; HCT138 is a decoder; HCT00 is a NAND flip-flop; LM7805 is a voltage regulator; TS7542 is an A/D, D/A converter; DICA2 is a set of 2 pins; DICA4 is a set of 4 pins; DIC14 is a set of 14 pins; HCT688 is an 8-bit comparator. (When the integrated circuit is available, its working can be compared to that of the electronic card, and the appropriateness of this set of elements can then be progressively tested by analogy.)

A programmable ASIC circuit is also produced which includes in the ASIC part:
an analog-to-digital converter;
a digital-to-analog converter;
a DMA (direct memory access) block;
a block allowing management of the dynamic storage (of the ARAM type);
static memory;
read-only memory (ROM);
mailbox.

Notable features of the ST18 Family include:
Parallel Harvard architecture: 32-bit instruction bus and triple 16-bit data buses.
Four UNITS: DATA STORAGE unit, DATA ARITHMETIC unit, program controller, I/O unit. The architecture allows all four units to work simultaneously.
16-bit external data bus for data memories and peripheral interface.
Three data modes: single precision, complex and double precision.

Notable features of the ST18932 include:
Multiplier 16×16→32 signed and unsigned
32-bit barrel shifter, 32-bit Arithmetic and Logic Unit
Provision for floating-point
Four 32-bit accumulators, four level 32-bit FIFO
Immediate and computed branch 2-level stack
8 external interrupt sources
Automatic loop, up to 256 times 32 instructions
Full speed access to up to 8K×16 data memory on the local bus
Software wait states to access slower external memory/peripherals
Three independent address calculation units
Addressing modes: immediate, direct, indirect with post modification, circular
192×16-bit and 128×16-bit on ship DATA RAM
Power-down mode
64K program memory space Notable features of the PC-932 Add-on Board for ST18932 include:
High speed file transfer between IBM-PC and ST18932 (16-bit data transfers)
Up to 32K×32 program memory and 3K×16 data memory
A/D and D/A converters (7.2) KHz, 8.0 KHz and 9.6 KHz sampling frequencies)
DSP internal and external memory management (upload and download data and program memories)
DSP software operation management (test points and breakpoints)
Runs with the ST18932 core chip (without emulator)
Runs with the HDS-932 emulator (for debug stage)
Operation with boundary scan probe.

Possible Use of the ST18932 PC-Board include:
Easy implementation and real time test of fast FOURIER transform.
FIR and IIR filters, compression algorithms using the analog front end and the file transfer facilities.
Algorithm debug: coupled with a HDS.
It becomes a very powerful device to track difficult problems as saturation, overflow . . .
Automatic test procedure facilities (creation of command batch)

The hardware, in the presently preferred embodiment, can operate in multiple modes. In open mode the emulator DSP is used for: program execution (program RAM located on emulator); or for external space access (external memory located on emulator or resources located on application using a 144CA probe). In boundary scan mode the emulator DSP is not used: a logic management block is used to read and modify internal resources of DSP core and glue via boundary scan, and a specific probe is used to connect emulator with final application.

In the presently preferred embodiment, five boundary scan emulation modes are available:

Set Breakpoint Mode: this is activated while a program is executing. The program is then stopped and breakpoint program address is stored into the boundary scan hardware.

Breakpoint Mode: the DSP halts program execution at the breakpoint address. I/O data can be captured and extracted serially from the boundary scan hardware.

Step by Step Mode: this is similar to the breakpoint node. The program execution is halted at each instruction.

Snapshot Mode: this is similar to the breakpoint node, except that program execution does not stop when the breakpoint occurs. It is only halted during I/O capture time and resumes after.

Load Exec Mode: when this mode is activated, instructions can be loaded via the boundary scan hardware, then executed.

The following table provides some indication of the relation between emulation features and the active mode of operation:

| EMULATION FEATURES | OPEN MODE | BOUNDARY SCAN MODE |
|---|---|---|
| 64K program memory | On emulator board | 1K internal PRAM |
| 4K coefficient memory | On emulator board | Read and write using test glue mode |
| 4K external memory | Emulated areas or not | Read and write using test glue mode |
| simple breakpoints | 28 activated at the same time | 1 hardware breakpoint |
| Conditional breakpoints | M times X followed by N times Y | More advanced conditional sequence (non-real-time) |
| Breakpoint on DBus value | Several areas of value associated or not with PC | Several areas of value associated or not with PC but out of real time execution |
| Pseudo real time mode | Trace of internal registers | Reduced functionality using using snapshot mode |

Another example of a test platform was also produced (card PC-ST934) from the ST18934 core circuit. This test platform has the same digital paths and the same control logic as the platform produced from the ST18932 DSP core (except that converter 7 has been deleted, since a converter is located in circuit ST18934).

A management program was also produced for each test platform. These management programs allow:
activation and deactivation of test and display points;
execution of the processing program in and outside real time;
display of the contents of the memories and main register;
access to the digital and analog data paths and the peripherals of the test platform and/or circuit.

An interface program was also produced for the different platforms. This program allows automatic validation of the processing program with the aid of predefined test patterns. It also allows data received over the digital paths to be stored on the microcomputer's hard disk and data to be read from the hard disk and sent onto the digital paths of the test platform. It is virtually independent of the platform used, which makes it possible to have one common man-machine interface for the different platforms.

The development of the programmed specific integrated circuit follows the following steps:
drawing up the project specifications according to the constraints of the user (overall dimensions, price, etc.);
specification of the circuit corresponding to the project specifications (including definition of hardware, processing program, management program and interface program);
study of the testability of the circuit and its hardware components and software;
definition and simulation of the circuit with the aid of the foundry library and tests;
production and simulation of the management program on a work station with the aid of tests defined for the testability study;
production of software modules and unit and global testing on a test platform with the aid of tests defined by the testability study;
generation of masks and fabrication of the circuit;
validation of the circuit with the aid of tests.

The choice of the different elements, distribution of functions and their interconnections stemmed from the block-by-block definition of functions when the ASIC was designed.

Parallel to the development of the integrated circuit (verification of the design, functional simulation, stability study, etc. on a work station, placement and routing, fabrication), an electronic card is produced grouping the discrete components and linking them in such a way as to make each one fulfill the previously determined functions.

This electronic card is also accompanied by software for interfacing with a microcomputer.

This microcomputer allows simulation of the environment of the integrated circuit by 1) performing the functions which cannot be performed by existing discrete components; 2) production of the program that is to be loaded into ROM memory 3; 3) design and production of tests of software functions performed and software/software and hardware/hardware interfaces; and 4) forming a data base of tests carried out which can then be used on the integrated circuit once it becomes available.

Thus the main specific and sensitive points of the integrated circuit and software can be tested with limited means, without having to resort to particularly long and complex tests which call for the implementation of powerful processing means only available on large machines and work stations.

The process and electronic card of the invention can be adapted and used to test and develop numerous ICs. A few examples of the numerous kinds of IC that can be developed in this way include those intended for modems, image compression, and speech compression.

The development example described above was used to produce a solid-state telephone answering machine with compression and decompression of audio tones.

The platform, or platforms, implemented allow the processing carried out by the microprocessor to be monitored from a reference speech sample or the study of different configurations (DSP alone, open ASIC, closed ASIC), the audio sample being either a reference sample or one that is randomly determined.

In all these cases, the audio patterns can be sampled, digitized and placed in memory in the microcomputer, in such a way that the digitized information representing them can be faithfully reproduced as often as necessary and introduced at the processing level in the desired form.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

Note that the disclosed innovations are not strictly limited to use of a DSP core, nor even to use of a microprocessor core: the disclosed innovations can also be adapted to use with other logic types of very high complexity, if such become available.

It should also be noted that the disclosed innovations may be particularly advantageous in developing custom multi-processing systems. However, the disclosed innovations are not by any means limited to this context.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A method for developing a programmed ASIC integrated circuit which includes a signal processor core, a RAM memory and a ROM memory for management and processing programs, and input-output management peripherals, and which performs command exchanges with external devices, said method comprising the steps of:
   (a) providing a core-emulation integrated circuit, which includes said signal processor core but does not include all other elements of said ASIC;
   (b) mounting said core-emulation integrated circuit on a first test platform circuit board which also includes one or more additional integrated circuits connected to emulate said RAM and ROM to said core-emulation integrated circuit, at least one data register for passing data between said core-emulation integrated circuit and said first additional integrated circuits, an analog/digital converter for sending and receiving analog data, and also includes diagnostic logic connected to provide monitoring and program loading by a microcomputer;
   (c) testing and debugging said first test platform, using testing and debugging features which are included in the processing programs and which can be activated by a subset of the application commands in both the final version of the integrated circuit and in any production versions, to provide initial debugging of one or more signal processing programs, but not the management programs, for use in a finished ASIC design; and
   (d) manufacturing integrated circuits incorporating said signal processor core, and RAM and ROM memories containing signal processing programs debugged in accordance with said step (c), and also containing management programs.

2. A method according to claim 1, further comprising the step of providing an interface program which allows said platform to be controlled, for automatic chaining of tests, from a microcomputer.

3. The IC development method of claim 1, wherein a programmable version of the programmed ASIC and a second test platform are produced in order to develop and test the processing and management software.

4. The IC development method of claim 1, wherein a programmed version of the IC and a third test platform are produced in order to validate all the processing and management software.

5. The IC development method of claim 1, wherein the tests conducted on said test platform include direct digital data communications between said microcomputer and said test platform, independently of input-output management peripherals specific to an application.

6. The IC development method of claim 1, wherein the tests conducted on said test platform include remote loading of a program from said microcomputer into the RAM memory of the test platform.

7. The IC development method of claim 1, wherein by simulation or experimentation, a data base of tests and of their results is formed in said microcomputer.

8. The IC development method of claim 6, wherein results obtained from said testing and expected results corresponding to either simulations or previous experiments, are compared.

9. The IC development method of claim 1, wherein said management program allows activation and deactivation of test and display points defined in said processing program, display of the contents of memories and main registers of the core of said microcomputer and execution of the software either in real time or not in real time to validate it.

10. The IC development method of claim 1, wherein an interface program allows control of the test platform and chaining of tests of the processing program in automatic fashion both in real time and not in real time.

11. The method of claim 1, further comprising the step of passing data between said core-emulation integrated circuit and said first test platform circuit board via at least one FIFO register.

12. The method of claim 3, wherein the testing and debugging of said core-emulation integrated circuit are performed simultaneously with the development and testing of said processing and management software.

13. A method for developing a programmed ASIC integrated circuit which includes a signal processor core, a RAM memory and a ROM memory for management and processing programs, and input-output management peripherals, and which performs command exchanges with external devices, said method comprising the steps of:
   (a) providing a core-emulation integrated circuit, which includes said signal processor core but does not include all other elements of said ASIC;
   (b) mounting said core-emulation integrated circuit on a first test platform circuit board which also includes one or more additional integrated circuits connected to emulate said RAM and ROM to said core-emulation integrated circuit, at least one data register for passing data between said core-emulation integrated circuit and said first additional integrated circuits, an analog/digital converter for sending and receiving analog data, and also includes diagnostic logic connected to provide monitoring and program loading by a microcomputer;
   (c) providing an interface program which allows said platform to be controlled, for automatic chaining of tests, from a microcomputer
   (d) testing and debugging said first test platform, using testing and debugging features which are included in the processing programs and which can be activated by a subset of the application commands in both the final version of the integrated circuit and in any production versions, to provide initial debugging of one or more signal processing programs, but not the management programs, for use in a finished ASIC design; and
   (e) manufacturing integrated circuits incorporating said signal processor core, and RAM and ROM memories containing signal processing programs debugged in accordance with said step (c), and also containing management programs.

14. A IC development method according to claim 13, further comprising the step of providing an interface program which allows said platform to be controlled, for automatic chaining of tests, from a microcomputer.

15. The IC development method of claim 13, wherein a programmable version of the programmed ASIC and a second test platform are produced in order to develop and test the processing and management software.

16. The IC development method of claim 13, wherein a programmed version of the IC and a third test platform are produced in order to validate all the processing and management software.

17. The IC development method of claim 13, wherein the tests conducted on said test platform include direct digital data communications between said microcomputer and said test platform, independently of input-output management peripherals specific to an application.

18. The IC development method of claim 13, wherein the tests conducted on said test platform include remote loading of a program from said microcomputer into the RAM memory of the test platform.

19. The IC development method of claim 13, wherein by simulation or experimentation, a data base of tests and of their results is formed in said microcomputer.

20. The IC development method of claim 19, wherein results obtained from said testing and expected results corresponding to either simulations or previous experiments, are compared.

21. The IC development method of claim 13, wherein said management program allows activation and deactivation of test and display points defined in said processing program, display of the contents of memories and main registers of the core of said microcomputer and execution of the software either in real time or not in real time to validate it.

22. The IC development method of claim 13, wherein an interface program allows control of the test platform and chaining of tests of the processing program in automatic fashion both in real time and not in real time.

23. The IC development method of claim 13, wherein the testing and debugging of said core-emulation integrated circuit are performed simultaneously with the development and testing of said processing and management software.

24. A method for developing a programmed ASIC integrated circuit which includes a signal processor core, a RAM memory and a ROM memory for management and processing programs, and input-output management peripherals, and which performs command exchanges with external devices, said method comprising the steps of:
   (a) providing a core-emulation integrated circuit, which includes said signal processor core but does not include all other elements of said ASIC;
   (b) mounting said core-emulation integrated circuit on a first test platform circuit board which also includes one or more additional integrated circuits connected to emulate said RAM and ROM to said core-emulation integrated circuit, at least one data register for passing data between said core-emulation integrated circuit and said first additional integrated circuits, an analog/digital converter for sending and receiving analog data, and also includes diagnostic logic connected to provide monitoring and program loading by a microcomputer;
   (c) passing data between said core-emulation integrated circuit and said first test platform circuit board via at least one FIFO register
   (d) testing and debugging said first test platform, using testing and debugging features which are included in the processing programs and which can be activated by a subset of the application commands in both the final version of the integrated circuit and in any production versions, to provide initial debugging of one or more signal processing programs, but not the management programs, for use in a finished ASIC design; and
   (e) manufacturing integrated circuits incorporating said signal processor core, and RAM and ROM memories containing signal processing programs debugged in accordance with said step (c), and also containing management programs.

25. The IC development method according to claim 24, further comprising the step of providing an interface program which allows said platform to be controlled, for automatic chaining of tests, from a microcomputer.

26. The IC development method of claim 24, wherein a programmable version of the programmed ASIC and a second test platform are produced in order to develop and test the processing and management software.

27. The IC development method of claim 24, wherein a programmed version of the IC and a third test platform are produced in order to validate all the processing and management software.

28. The IC development method of claim 24, wherein the tests conducted on said test platform include direct digital data communications between said microcomputer and said test platform, independently of input-output management peripherals specific to an application.

29. The IC development method of claim 24, wherein the tests conducted on said test platform include remote loading of a program from said microcomputer into the RAM memory of the test platform.

30. The IC development method of claim 24, wherein by simulation or experimentation, a data base of tests and of their results is formed in said microcomputer.

31. The IC development method of claim 30, wherein results obtained from said testing and expected results corresponding to either simulations or previous experiments, are compared.

32. The IC development method of claim 24, wherein said management program allows activation and deactivation of test and display points defined in said processing program, display of the contents of memories and main registers of the core of said microcomputer and execution of the software either in real time or not in real time to validate it.

33. The IC development method of claim 24, wherein an interface program allows control of the test platform and chaining of tests of the processing program in automatic fashion both in real time and not in real time.

34. The IC development method of claim 26, wherein the testing and debugging of said core-emulation integrated circuit are performed simultaneously with the development and testing of said processing and management software.

* * * * *